(12) United States Patent
Bae et al.

(10) Patent No.: US 11,695,453 B2
(45) Date of Patent: Jul. 4, 2023

(54) METHOD FOR MAINTAINING BEAMFORMING IN WIRELESS AV SYSTEM, AND WIRELESS DEVICE USING SAME

(71) Applicant: LG ELECTRONICS INC., Seoul (KR)

(72) Inventors: Hyowon Bae, Seoul (KR); Jungwoo Kim, Seoul (KR); Jinmin Kim, Seoul (KR); Jaewook Song, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 17 days.

(21) Appl. No.: 17/599,419

(22) PCT Filed: May 7, 2019

(86) PCT No.: PCT/KR2019/005416
§ 371 (c)(1),
(2) Date: Sep. 28, 2021

(87) PCT Pub. No.: WO2020/226196
PCT Pub. Date: Nov. 12, 2020

(65) Prior Publication Data
US 2022/0216897 A1 Jul. 7, 2022

(51) Int. Cl.
*H04B 7/0408* (2017.01)
*H04B 17/309* (2015.01)
(Continued)

(52) U.S. Cl.
CPC ......... *H04B 7/0408* (2013.01); *H04B 7/0413* (2013.01); *H04B 7/0491* (2013.01); *H04B 17/309* (2015.01)

(58) Field of Classification Search
CPC .. H04B 17/309; H04B 7/0413; H04B 7/0491; H04B 7/0408
See application file for complete search history.

(56) References Cited

U.S. PATENT DOCUMENTS

| 2017/0070275 A1 | 3/2017 | Jo et al. |
| 2017/0156067 A1* | 6/2017 | Huang ................ H04B 7/063 |
| 2017/0223552 A1 | 8/2017 | Roy et al. |

FOREIGN PATENT DOCUMENTS

| KR | 10-2017-0004183 A | 1/2017 |
| KR | 10-2018-0134625 A | 12/2018 |

OTHER PUBLICATIONS

3GPP TSG RAN WG1 Nr Ad-Hoc Meeting, Samsung, "Overview of NR Unlicensed and Shared Spectrums", R1-1701005, Jan. 10, 2017, Spokane, USA, total 6 pages.

\* cited by examiner

*Primary Examiner* — Rahel Guarino
(74) *Attorney, Agent, or Firm* — Birch, Stewart, Kolasch & Birch, LLP

(57) ABSTRACT

A method by which a first wireless device maintains beamforming in a wireless AV system, according to one embodiment of the present invention, comprises the steps of: transmitting a packet including a non-training field and a plurality of training fields to a second wireless device, wherein the non-training field is transmitted on the basis of the best sector combination from among a plurality of candidate sector combinations predetermined between the first wireless device and the second wireless device, and the plurality of training fields is transmitted on the basis of the plurality of candidate sector combinations; receiving candidate beam feedback information as a response to the plurality of training fields; determining, on the basis of the candidate beam feedback information, whether a channel change due to an obstacle occurs; and updating the best sector combination on the basis of the candidate beam feedback information when it is determined that the channel change occurs.

14 Claims, 26 Drawing Sheets

(51) Int. Cl.
*H04B 7/0413* (2017.01)
*H04B 7/0491* (2017.01)

FIG. 1
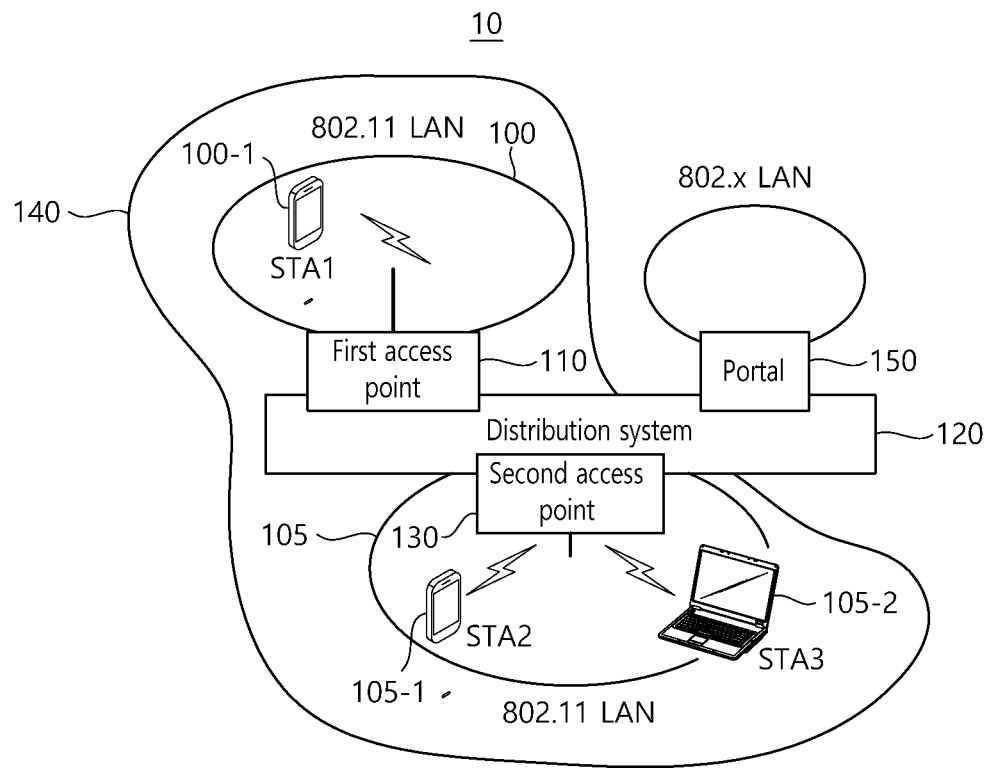
(A)
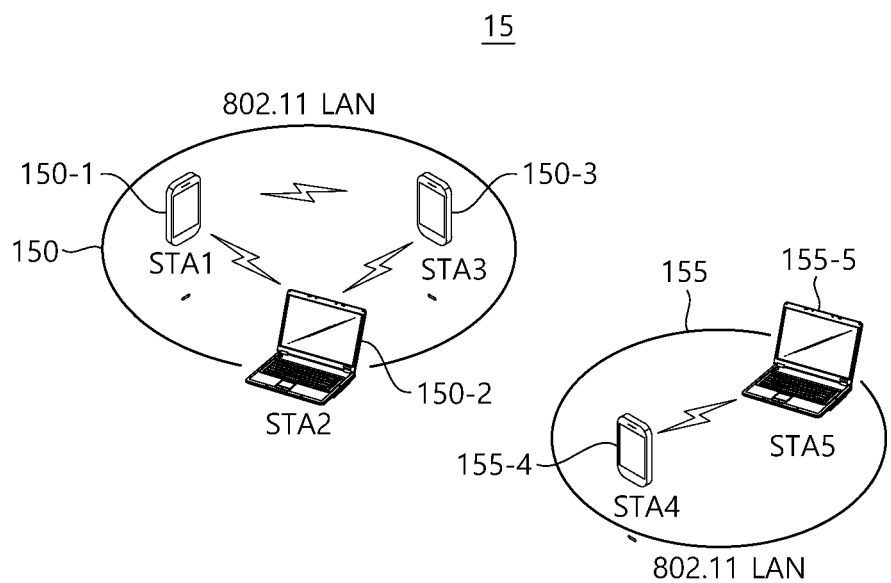
(B)

FIG. 8

| CH 1 | L-STF | L-CE | L-Header | ay Header A | | | | |
|---|---|---|---|---|---|---|---|---|
| | GF-STF | GF-CE | | | ay STF | ay CE | ay Header B | ay payload |
| CH 2 | L-STF | L-CE | L-Header | ay Header A | | | | |

(L: Legacy, GF: Gap Filling, ay: 802.11ay)

METHOD FOR MAINTAINING BEAMFORMING IN WIRELESS AV SYSTEM, AND WIRELESS DEVICE USING SAME

CROSS REFERENCE TO RELATED APPLICATION

This application is the National Phase of PCT International Application No. PCT/KR2019/005416, filed on May 7, 2019, which is hereby expressly incorporated by reference into the present application.

BACKGROUND OF THE DISCLOSURE

Field of the Disclosure

The present specification relates to a wireless device and, most particularly, to a method for maintaining beamforming in a wireless Audio-Video (AV) system and a wireless device using the same.

Related Art

Recently, there is a growing demand for high-resolution and high-quality pictures such as a high definition (HD) picture and an ultra-high definition (UHD) picture in various fields. The higher the resolution and quality of picture data, the greater the amount of information of bits to be transmitted relative to the existing picture data. Therefore, transmission cost may increase when the picture data is transmitted using a medium such as the existing wired/wireless broadband line.

Meanwhile, the Institute of Electrical and Electronics Engineers (IEEE) 802.11ad standard is an ultra-high speed wireless communication standard, which operates in a band of 60 GHz or more. The coverage range of signal is approximately 10 meters, but a throughput of 6 Gbps or more may be supported. Since operation is performed in a high frequency band, a signal propagation is dominated by a ray-like propagation. Signal quality may be improved so that a transmit (TX) or receive (RX) antenna beam can be arranged to be directed toward a strong spatial signal path.

The IEEE 802.11ad standard provides a beamforming training procedure for antenna beam arrangement. Meanwhile, IEEE 802.11ay is a next generation standard, which is under development in order to achieve a throughput of 20 Gbps or more.

SUMMARY OF THE DISCLOSURE

Technical Objects

An object of the present specification is to provide a method for maintaining beamforming in a wireless Audio-Video (AV) system and a wireless device using the same having enhanced capabilities (or performance) by supporting real-time operation by performing fast adaptation to instant blockage and reducing redundancy associated with beamforming.

Technical Solutions

According to the present embodiment, a method for maintaining beamforming in a wireless audio-video (AV) system, the method being performed by a first wireless device, may include the steps of transmitting a packet including a non-training field and multiple training fields to a second wireless device, wherein the non-training field is transmitted based on a best sector combination among predetermined multiple candidate sector combinations between the first wireless device and the second wireless device, and wherein the multiple training fields are transmitted based on the multiple candidate sector combinations, receiving candidate beam feedback information as a response to the multiple training fields, determining whether or not a channel change that is caused by blockage occurs based on the candidate beam feedback information, and, based on the determined result that the channel change occurs, updating the best sector combination based on the candidate feedback information.

Effects of the Disclosure

According to an embodiment of the present specification, a method for maintaining beamforming in a wireless Audio-Video (AV) system and a wireless device using the same having enhanced capabilities (or performance) may be provided by supporting real-time operation by performing fast adaptation to instant blockage and reducing redundancy associated with beamforming.

BRIEF DESCRIPTION OF THE DRAWINGS

FIG. 1 is a conceptual diagram showing a structure of a wireless LAN system.

FIG. 8 is a diagram showing a PPDU structure according to an embodiment of the present disclosure.

DESCRIPTION OF EXEMPLARY EMBODIMENTS

Figure 2:
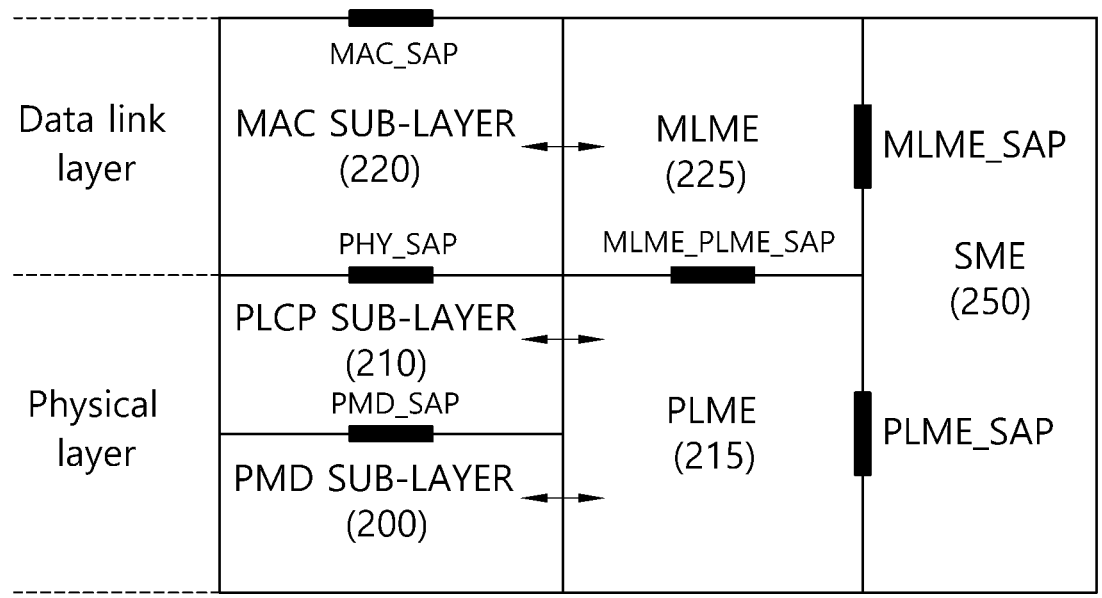
FIG. 2 is a conceptual diagram of a hierarchical architecture of a wireless LAN system supported by IEEE 802.11.

Hereinafter, embodiments related to the present specification will be described in detail with reference to the accompanying drawings. The suffixes "module" and "unit" for components that are used in the following description are given or interchangeably used in order to merely facilitate the description of the present specification. And, therefore, such suffixes do not have any distinctive meaning or role by themselves.

A wireless device according to an embodiment of the present specification is, for example, an intelligent display device having computer supporting functions added to a broadcast receiving function. And, therefore, while being dedicated to the broadcast receiving function, since an Internet function, and so on, are added herein, the wireless device may also be equipped with an easy-to-use interface, such as a handwriting input device, a touch screen, or a spatial remote controller, and so on. Moreover, with the support of a wired or wireless internet function, the wireless device may access the Internet and other computers, thereby being capable of performing various functions, such as receiving/sending e-mails, web browsing, banking, or playing games. In order to achieve such functions, a standardized universal OS may be used.

Herein, for example, since various types of applications may be freely added or deleted within a universal OS kernel, the wireless device that is described in the present specification may perform various user-friendly functions. More specifically, for example, the wireless device may be a network TV, an HBBTV, a smart TV, an LED TV, an OLED TV, and so on. And, in some cases, the wireless device is also applicable to smartphones.

FIG. 1 is a conceptual diagram showing a structure of a wireless LAN system. FIG. 1(A) shows a structure of an infrastructure network of Institute of Electrical and Electronic engineers (IEEE) 802.11.

Referring to (A) of FIG. 1, the wireless system (10) shown in (A) of FIG. 1 may include at least one basic service set (BSS) (100, 105). A BSS is a set of an access point (hereinafter referred to as 'AP') and a station (hereinafter referred to as 'STA') that can perform communication between one another by successfully establishing synchronization and does not refer to a specific area.

For example, a first BSS (100) may include a first AP (110) and a single first STA (100-1). A second BSS (105) may include a second AP (130) and one or more STAs (105-1, 105-2).

The infrastructure BSSs (100, 105) may include at least one STA, APs (110, 130) providing a distribution service, and a distribution system (DS) (120) that connects the multiple APs.

The distribution system (120) may implement an extended service set (ESS) (140) by connecting the plurality of BSSs (100, 105). The ESS (140) may be used as a term indicating a network that connects one or more APs (110, 130) through the distribution system (120). One or more APs included in the single ESS (140) may have the same service set identifier (hereinafter referred to as 'SSID').

A portal (150) may serve as a bridge for connecting the wireless LAN network (IEEE 802.11) to another network (e.g., 802.X).

In the wireless LAN system having the structure shown in (A) of FIG. 1, a network between the APs (110, 130) and a network between the APs (110, 130) and the STAs (100-1, 105-1, 105-2) can be implemented.

(B) of FIG. 1 is a conceptual diagram showing an independent BSS. Referring to (B) of FIG. 1, a wireless LAN system (15) shown in (B) of FIG. 1 may establish a network between STAs without the APs (110, 130) such that the STAs can perform communication, unlike the wireless LAN system of (A) of FIG. 1. A network established between STAs without the APs (110, 130) for communication is defined as an ad-hoc network or an independent basic service set (hereinafter referred to as 'IBSS').

Referring to (B) of FIG. 1, the IBSS (15) is a BSS operating in an ad-hoc mode. The IBSS does not have a centralized management entity because an AP is not included therein. Accordingly, STAs (150-1, 150-2, 150-3, 155-4, 155-5) are managed in a distributed manner in the IBSS (15).

All STAs (150-1, 150-2, 150-3, 155-4, 155-5) of the IBSS may be configured as mobile STAs and are not allowed to access a distributed system. All STAs of the IBSS configure a self-contained network.

An STA mentioned in the present disclosure is an arbitrary functional medium including medium access control (MAC) conforming to regulations of Institute of Electrical and Electronics Engineers (IEEE) 802.11 and a physical layer interface for a wireless medium, and a broad meaning of this term may include both an AP and a non-AP station.

The STA mentioned in the present disclosure may also be referred to by using various terms, such as a mobile terminal, a wireless device, a wireless transmit/receive unit (WTRU), a user equipment (UE), a mobile station (MS), a mobile subscriber unit, and, simply, a user.

FIG. 2 is a conceptual diagram of a hierarchical architecture of a wireless LAN system supported by IEEE 802.11.

Referring to FIG. 2, the hierarchical architecture of the wireless LAN system may include a physical medium dependent (PMD) sublayer (200), a physical layer convergence procedure (PLCP) sublayer (210), and a medium access control (MAC) sublayer (220).

The PMD sublayer (200) may serve as a transport interface for transmitting and receiving data between STAs. The PLCP sublayer (210) is implemented such that the MAC sublayer (220) can operate with minimum dependency on the PMD sublayer (200).

The PMD sublayer (200), the PLCP sublayer (210), and the MAC sublayer (220) may conceptually include a management entity. For example, a manager of the MAC sublayer (220) is called a MAC layer management entity (MLME) (225). A manager of the physical layer is called a PHY layer management entity (PLME) (215).

These managers may provide interfaces for performing layer management operation. For example, the PLME (215) may be connected to the MLME (225) to perform a management operation of the PLCP sublayer (210) and the PMD sublayer (200). The MLME (225) may be connected to the PLME (215) to perform a management operation of the MAC sublayer (220).

In order to perform correct MAC layer operation, an STA management entity (SME) (250) may be provided. The SME (250) may be operated as an independent component in each layer. The PLME (215), the MLME (225), and the SME (250) may transmit and receive information based on primitive.

The operation in each sublayer will be briefly described below. For example, the PLCP sublayer (210) transfers a MAC protocol data unit (MPDU) received from the MAC sublayer (220) to the PMD sublayer (200) or transfers a frame from the PMD sublayer (200) to the MAC sublayer (220) between the MAC sublayer (220) and the PMD sublayer (200) according to an instruction of the MAC layer.

The PMD sublayer (200) is a sublayer of PLCP and may perform data transmission and reception between STAs through a wireless medium. An MPDU transferred from the MAC sublayer (220) is referred to as a physical service data unit (PSDU) in the PLCP sublayer (210). Although the MPDU is similar to the PSDU, an individual MPDU may differ from an individual PSDU when an aggregated MPDU corresponding to an aggregation of a plurality of MPDU is transferred.

The PLCP sublayer (210) adds an additional field including information that is needed by a transceiver of the physical layer during a process of receiving a PSDU from the MAC sublayer (220) and transferring the PSDU to the PMD sublayer (200). At this point, the added field may be a PLCP preamble and a PLCP header added to the PSDU and tail bits needed for returning a convolution encoder to a zero state, and the like.

The PLCP sublayer (210) adds the aforementioned field to the PSDU to generate a PLCP protocol data unit (PPDU) and transmits the PPDU to a receiving station through the PMD sublayer (200), and the receiving station receives the PPDU and obtains information needed for data restoration from the PLCP preamble and the PLCP header in order to restore (or recover) data.

Figure 3:
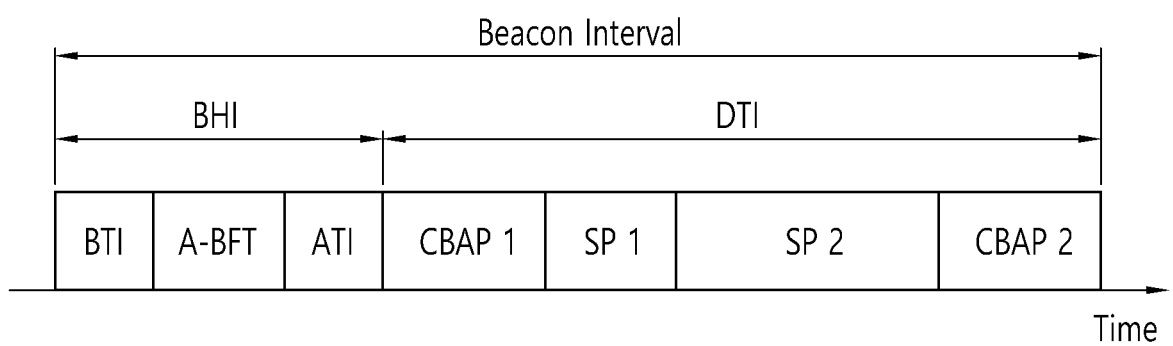
FIG. 3 is a diagram for describing an access period within a beacon interval.

FIG. 3 is a diagram for describing an access period within a beacon interval.

Referring to FIG. 3, time of a wireless medium may be defined based on a beacon interval between a beacon frame and a beacon frame. For example, a beacon interval may be 1024 milliseconds (msec).

A plurality of sub-periods within a beacon interval may be referred to as an access period. Different access periods within one beacon interval may have different access rules.

For example, information on an access period may be transmitted, by an AP or Personal basic service set Control Point (PCP), to a non-AP STA or non-PCP.

Referring to FIG. 3, one beacon interval may include a Beacon Header Interval (hereinafter referred to as 'BHI') and a Data Transfer Interval (hereinafter referred to as 'DTI').

For example, a BHI may be a time period starting from a target beacon transmission time (hereinafter referred to as 'TBTT') of a beacon interval and ending before the start (or beginning) of a DTI.

The BHI of FIG. 3 may include a Beacon Transmission Interval (hereinafter referred to as 'BTI'), an Association Beamforming Training (hereinafter referred to as 'A-BFT'), and an Announcement Transmission Interval (hereinafter referred to as 'ATI').

For example, a BTI may be a time period starting from the beginning (or start) of a first beacon frame to the end of a last beacon frame, which are transmitted by a wireless UE within a beacon interval. That is, a BTI may be a period during which one or more DMG beacon frames may be transmitted.

For example, an A-BFT may be a period during which beamforming training is performed by the STA that has transmitted the DMG beacon frame(s) during the preceding BTI.

For example, an ATI may be a Request-Response based management access period between a PCP/AP and a non-PCP/non-AP STA. The Data Transfer Interval (hereinafter referred to as 'DTI') of FIG. 3 may be a period during which frames are exchanged between multiple STAs.

As shown in FIG. 3, one or more Contention Based Access Periods (hereinafter referred to as 'CBAP') and one or more Service Periods (hereinafter referred to as 'SP') may be allocated to the DTI.

A DTI schedule of the beacon interval shown in FIG. 3 may be communicated through an Extended Schedule element, which is included in the beacon frame (or Announcement frame). That is, an Extended Schedule element may include schedule information for defining multiple allocations that are included in the beacon interval.

Detailed descriptions of the beacon frame are mentioned in Section 9.4.2.132 of the IEEE Draft P802.11-REVmc™/D8.0, August 2016 'IEEE Standard for Information Technology Telecommunications and information exchange between systems—Local and metropolitan area networks— Specific requirements Part 11: Wireless LAN Medium Access Control (MAC) and Physical Layer (PHY) Specifications (hereinafter referred to as IEEE 802.11)', which was disclosed in August 2016.

Although FIG. 3 illustrates an example of two CBAPs and two SPs being allocated for one DTI, this is merely exemplary. And, therefore, it shall be understood that the present specification will not be limited only to this.

Figure 4:
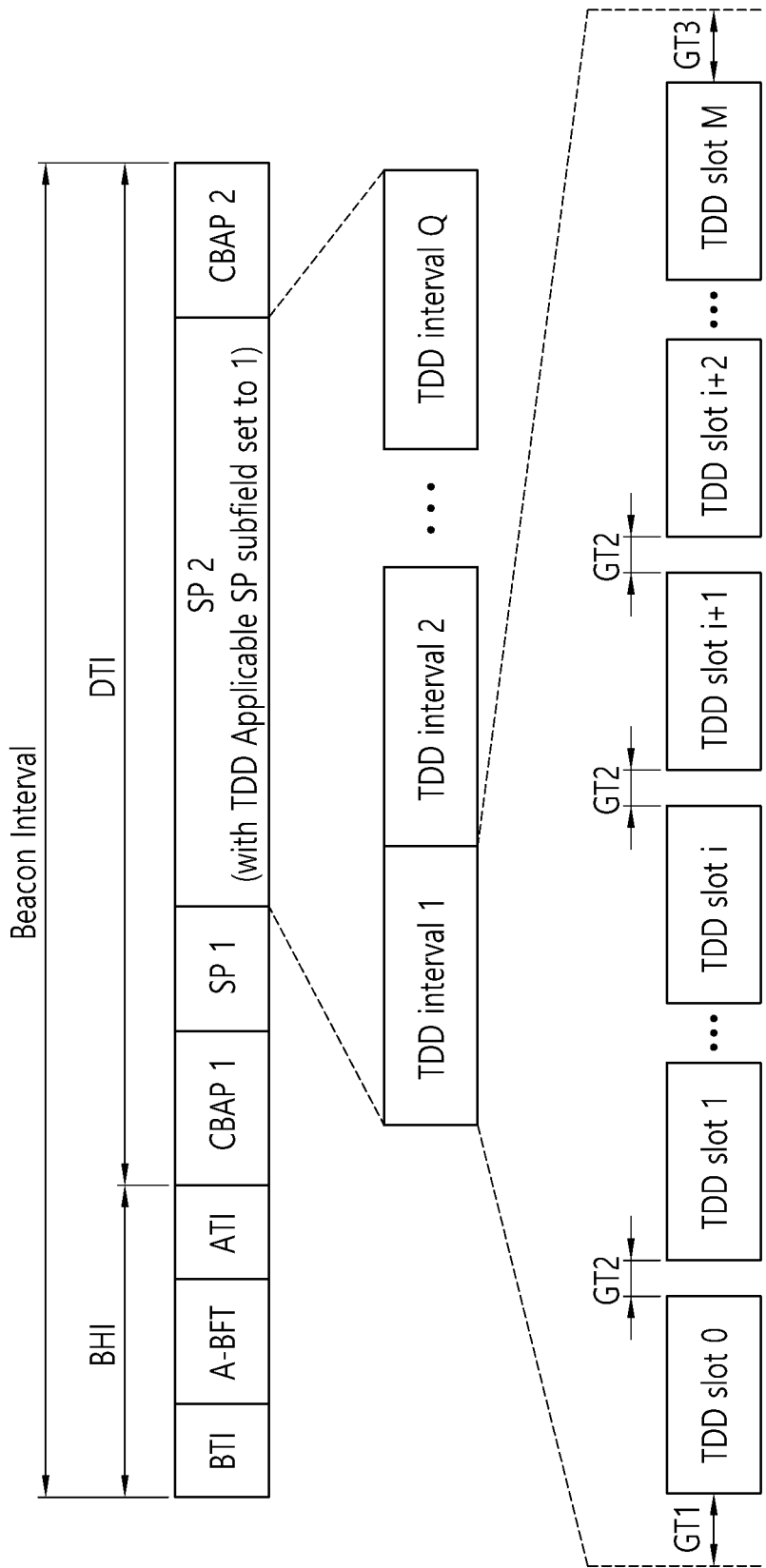
FIG. 4 is a conceptual diagram of a time division duplex (TDD) SP structure.

FIG. 4 is a conceptual diagram of a time division duplex (TDD) SP structure.

Referring to FIG. 1 to FIG. 4, among a plurality of allocation fields (not shown) that are included in the Extended Schedule element, which is included in a beacon frame, an allocation field for a second Service Period (SP2) of FIG. 4 may include a first subfield and a second subfield.

For example, the first subfield being included in the allocation field for the second Service Period (SP2) of FIG. 4 may be set to a value indicating SP allocation. Additionally, the second subfield being included in the allocation field for the second Service Period (SP2) of FIG. 4 may be set to a value indicating that the second service period (SP2) is a TDD SP that is based on TDD channel access.

In the present specification, when information for a TDD SP is included in the Extended Schedule element, the Extended Schedule element may be included in each beacon frame that is being transmitted.

Additionally, when an Extended Schedule element is transmitted at least one time from a beacon interval, with the exception for any special cases, the content of the Extended Schedule element may not be changed.

Referring to FIG. 4, the structure of the second service period (SP2), which is a TDD SP, may include a plurality of consecutive and adjacent TDD intervals (TDD interval 1~TDD interval Q, wherein Q is an integer). For example, a number of the plurality of TDD intervals of FIG. 4 may be equal to Q.

Additionally, each of the plurality of TDD intervals may include one or more TDD slots. For example, a first TDD interval (TDD interval 1) may include M+1 (wherein M is an integer) number of slots.

For example, a time interval starting from a start point of the first TDD interval (TDD interval 1) up to before a start point of a first TDD slot (i.e., TDD Slot 0), may be defined as a first guard time (hereinafter referred to as 'GT1').

For example, a time interval between each TDD slot included in the first TDD interval (TDD interval 1) may be defined as a second guard time (GT2).

For example, a time interval starting from an end point of an (M+1)th TDD slot (TDD slot M) up to an end point of the first TDD interval (TDD interval 1) may be defined as a third guard time (GT3).

For example, each of the plurality of TDD intervals (TDD interval 1~TDD interval Q) may have the same length. Each of the M+1 number of TDD slots (e.g., TDD slot 0~TDD slot M of FIG. 4) included in one TDD interval (e.g., TDD interval 1 of FIG. 4) may have a different length.

Referring to FIG. 4, the structure(s) of one or more TDD slots being included in the first TDD interval (i.e., TDD interval 1) may be repeatedly applied to the remaining TDD intervals (i.e., TDD interval 2~TDD interval Q).

Figure 5:
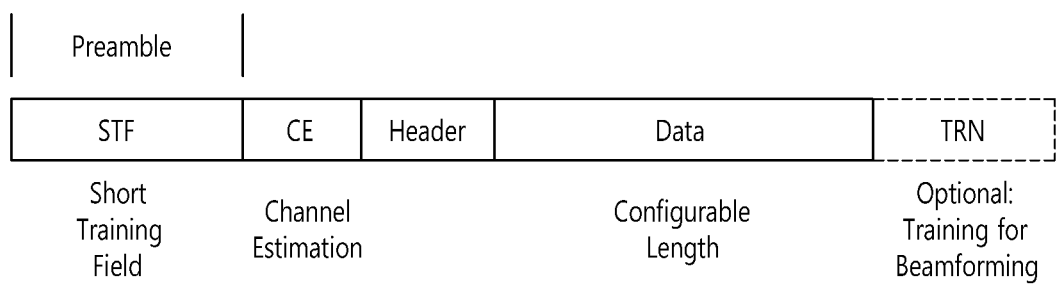
FIG. 5 is a diagram for describing a physical configuration of a related art radio frame.

FIG. 5 is a diagram for describing a physical configuration of a related art radio frame.

Referring FIG. 5, it is assumed that a Directional Multi-Gigabit (DMG) physical layer commonly includes the fields shown in FIG. 5. However, depending upon each mode, there may be differences in the regulation method and modulation/coding scheme(s) used for each separate field.

A preamble of the radio frame shown in FIG. 5 may include a Short Training Field (STF) and a Channel Estimation (CE) field. Additionally, the radio frame may include a header field, a data field for a payload, and a Training (TRN) field for beamforming.

Figure 6:
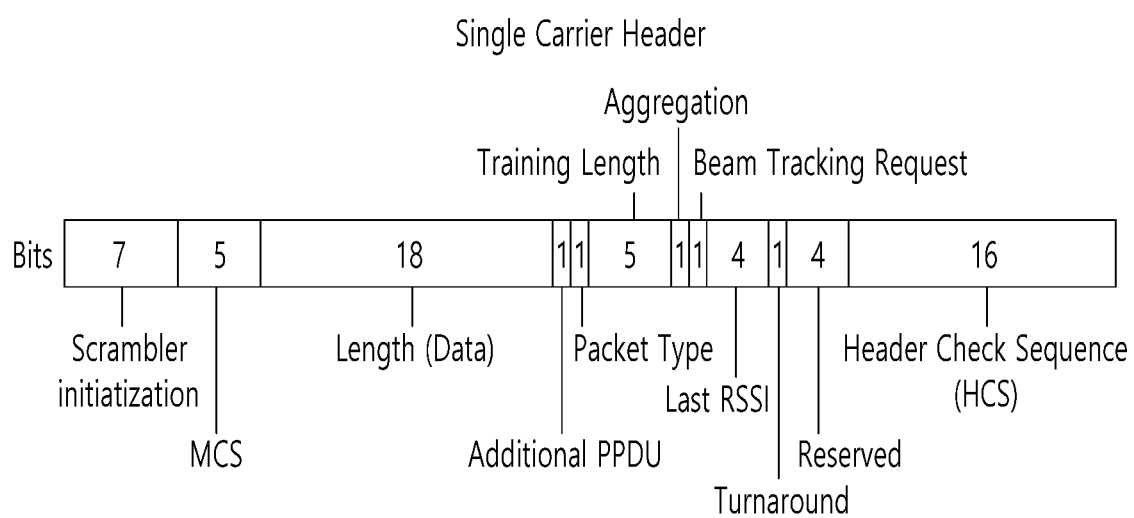
FIG. 6 and FIG. 7 are detailed diagrams showing a header field included in the radio frame of FIG. 5.
Figure 7:
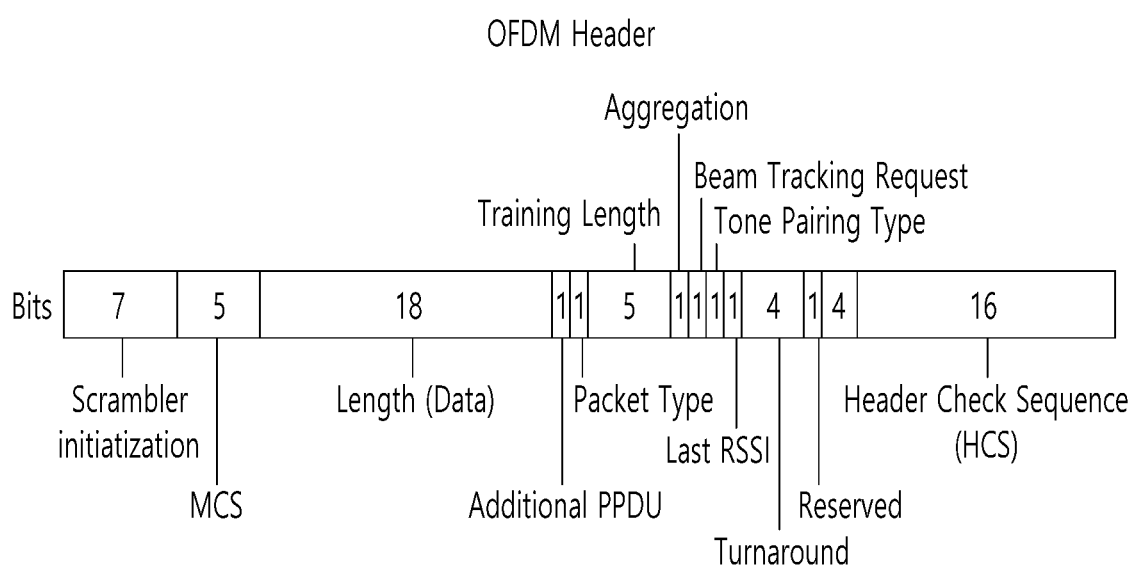

FIG. 6 and FIG. 7 are detailed diagrams showing a header field included in the radio frame of FIG. 5.

Referring to FIG. 6, the diagram shows a case where a Single Carrier (SC) mode is used. In the SC mode, the header field may include information, such as information indicating an initial value for scrambling, a Modulation and Coding Scheme (MCS), information indicating data length, information indicating the presence or absence of an additional Physical Protocol Data Unit (PPDU), a packet type, a training length, performance or non-performance of aggregation, presence or absence of a beam training request, a last Received Signal Strength Indicator (RSSI), performance or non-performance of truncation, Header Check Sequence (HCS), and so on. Additionally, as shown in FIG. 6, the header has 4 bits of reserved bits, and such reserved bits may be used as described below in the following description.

Referring to 7, the diagram shows a detailed configuration of the header field, when an OFDM mode is applied. For example, when the OFDM mode is applied, the header field may include information, such as information indicating an initial value for scrambling, an MCS, information indicating data length, information indicating the presence or absence of an additional PPDU, a packet type, a training length, performance or non-performance of aggregation, presence or absence of a beam training request, a last RSSI, performance or non-performance of truncation, Header Check Sequence (HCS), and so on.

As shown in FIG. 7, the header has 2 bits of reserved bits, and such reserved bits may be used as described below in the following description, just as in the case of FIG. 6.

Channel bonding and MIMO technology are adopted in the IEEE 802.11 ay. In order to implement the channel bonding and MIMO technology in 11ay, a new PPDU structure is needed. That is, when using the conventional (or existing) 11ad PPDU structure, there are limitations in implementing the channel bonding and MIMO technology while supporting a legacy UE at the same time.

In the present specification, a new field for an 11ay UE may be defined after the legacy preamble and legacy header field that are used for supporting the legacy UE. Herein, the channel bonding and MIMO technology may be supported based on the newly defined field.

FIG. 8 is a diagram showing a PPDU structure according to an embodiment of the present disclosure. In FIG. 8, a horizontal axis may correspond to a time domain, and a vertical axis may correspond to a frequency domain.

When the channel bonding scheme is applied for two or more channels (e.g., CH1, CH2 of FIG. 8), a frequency band having a predetermined size (e.g., a 400 MHz band) may exist between frequency bands (e.g., 1.83 GHz) being used in each channel. In case of a Mixed mode, when a legacy preamble (e.g., L-STF, L-CE of FIG. 8) is duplicated and transmitted through each channel, the present embodiment may consider a transmission of a new STF and CE field (i.e., gap filling) together with the legacy preamble at the same time through a 400 MHz band between each channel.

In this case, as shown in FIG. 8, the PPDU structure according to the present disclosure may have a structure of transmitting an ay STF, ay CE, ay header B, and payload through a wideband after the legacy preamble, legacy header, and ay header A. Therefore, the ay header, ay payload fields, and so on being transmitted after the header field may be transmitted through channels that are used for bonding. Hereinafter, in order to differentiate the ay header from the legacy header, the ay header may also be referred to as an enhanced directional multi-gigabit (EDMG) header, and the corresponding term may be interchangeably used.

For example, a total of 6 or 8 channels (each 2.16 GHz) may exist in 11ay, and a maximum of 4 channels may be bonded and transmitted to a single STA. Accordingly, the ay header and ay payload may be transmitted through 2.16 GHz, 4.32 GHz, 6.48 GHz, 8.64 GHz bandwidths.

Alternatively, a PPDU format corresponding to a case where the legacy preamble is repeatedly transmitted without performing Gap-Filling may also be considered.

In this case, since Gap-Filling is not performed, without the GF-STF and GF-CE fields, which are marked in dotted lines in FIG. 8, the ay STF, ay CE, and ay header B are transmitted through a wideband after the legacy preamble, legacy header, and ay header A.

Figure 9:
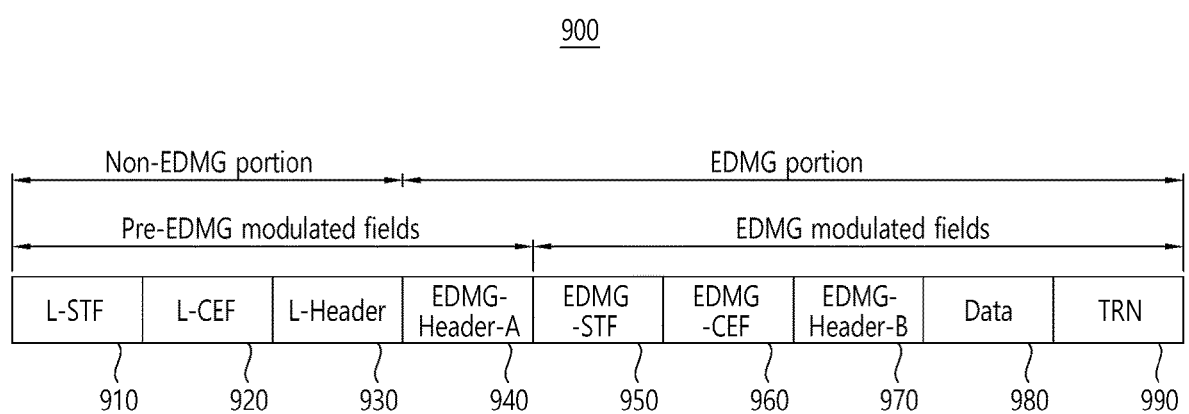
FIG. 9 is a diagram showing a PPDU structure according to an embodiment of the present disclosure.

FIG. 9 is a diagram showing a PPDU structure according to an embodiment of the present disclosure.

Referring to FIG. 9, a PPDU (900) format that is applicable to the 11ay system may include a legacy-Short Training Field (L-STF) (910), a legacy-channel estimation field (L-CEF) (920), an L-Header field (930), an EDMG- Header-A field (940), an EDMG-STF (950), an EDMG-CEF (960), an EDMG-Header B field (970), a Data field (980), and a training (TRN) field (990).

For example, the above-mentioned fields (910~990) may be selectively included in accordance with the PPDU format (e.g., SU PPDU, MU PPDU, and so on).

For example, the part including the L-STF (910), L-CEF (920), and L-header field (930) may be referred to as a Non-EDMG portion, and the remaining part (940~990) may be referred to as an EDMG portion.

Meanwhile, the L-STF (910), L-CEF (920), L-Header field (930), and EDMG-Header-A field (940) may be referred to as pre-EDMG modulated fields, and the remaining parts (950~990) may be referred to as EDMG modulated fields.

For example, the (legacy) preamble part of the PPDU (900) may be used for packet detection, Automatic Gain Control (AGC), frequency offset estimation, synchronization), instruction for modulation (SC or OFDM), and channel estimation.

Meanwhile, the preamble format of the PPDU 900) may be commonly applied for an OFDM packet and an SC packet. In this case, the preamble of the PPDU (900) may be configured of a Short Training Field (STF) and a Channel Estimation (CE) field that is located after the STF.

Figure 10:
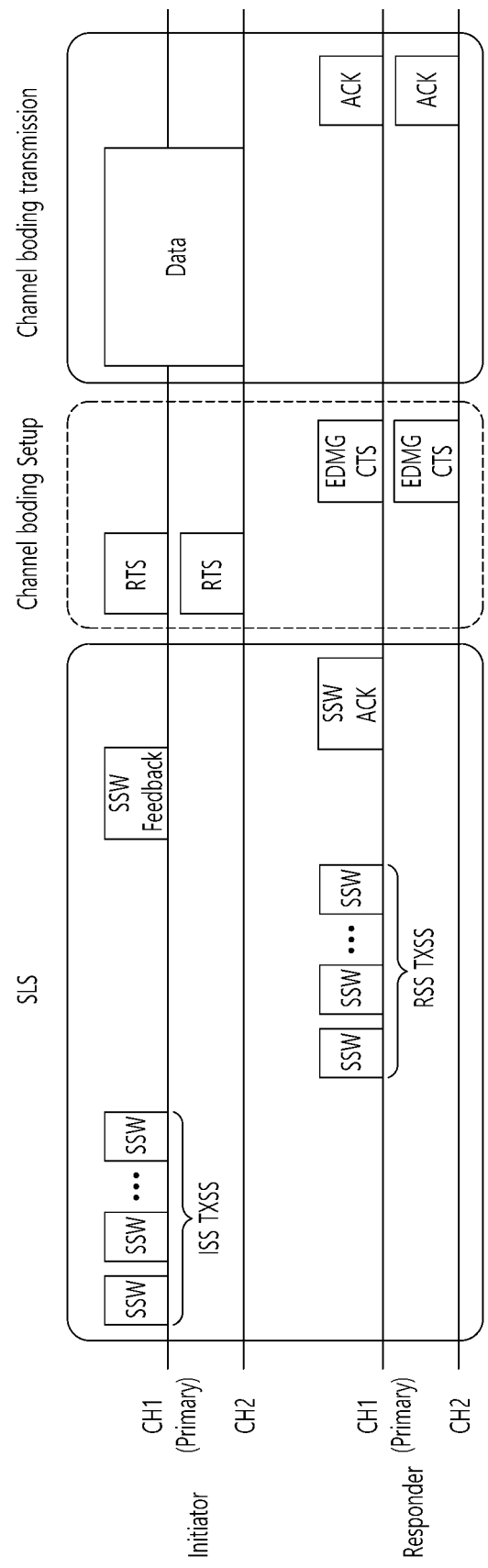
FIG. 10 illustrates operations of performing beamforming for a channel according to the embodiment of the present disclosure.

FIG. 10 illustrates operations of performing beamforming for a channel according to the embodiment of the present disclosure.

Referring to FIG. 10, an STA that intends to transmit data through a beamforming operation will be referred to as an initiator, and an STA that receives data from the initiator will be referred to as responder.

Additionally, although FIG. 10 shows only a total of two channels (e.g., CH1, CH2), it shall be understood that the structure of the present specification may be extendedly applied also to channel bonding/channel aggregation through 3 or more channels.

As shown in FIG. 10, beamforming training according to the present embodiment may be configured of a Sector Level Sweep (SLS) phase (or step), a channel bonding setup phase, and a channel bonding transmission phase. For reference, the SLS phase has the following characteristics.

In order to communicate (or transfer) data or control information, and so on, with higher reliability in a 60 GHz band that is supported in the 11ay system, a directional transmission method may be applied instead of an omni-transmission method.

STAs intending to transmit/receive data in the 11ay system may respectively know a TX best sector or RX best sector for the initiator and the responder through the SLS process. For reference, the SLS phase will hereinafter be described in more detail with reference to FIG. 12 and FIG. 13, which will be described later on.

Figure 11:
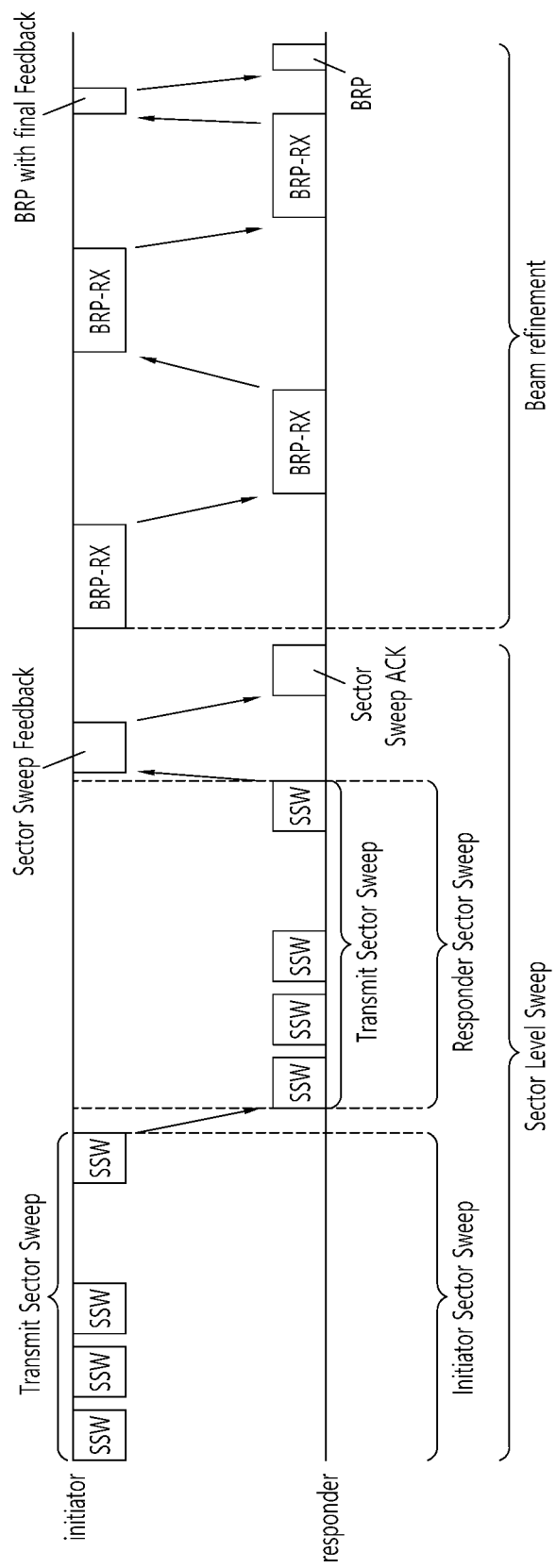
FIG. 11 shows an example of a beamforming training process according to an embodiment of the present disclosure.

FIG. 11 shows an example of a beamforming training process according to an embodiment of the present disclosure.

Referring to FIG. 1 to FIG. 11, in BF training, which occurs during Association Beamforming Training (A-BFT) allocation, an AP or PCP/AP is the initiator, and a non-AP and non-PCP/AP STA is the responder. In BF training, which occurs during SP allocation, a source (EDMG) STA of the SP is the initiator, and a target STA of the SP is the responder. In BF training, which occurs during Transmission Opportunity (TXOP) allocation, a TXOP holder is the initiator, and a TXOP responder is the responder.

A link from the initiator to the responder will be referred to as an initiator link, and a link from the responder to the initiator will be referred to as a responder link.

The BF training process starts with an SLS from the initiator. The purpose of the SLS phase is to enable communication between two STAs at a control PHY rate or higher MCS. Most particularly, the SLS phase provides only the transmission of the BF training.

Additionally, when a request is made by the initiator or responder, a Beam Refinement Protocol (or Beam Refinement Phase) (BRP) may be performed subsequent to the SLS phase.

The purpose of the BRP phase is to enable reception (RX) training and to enable iterative refinement of an Antenna Weight Vector (AWV) of all transmitters and receivers within all STAs. If one of the STAs participating in the beam training chooses to use a single transmission (TX) antenna pattern, the RX training may be performed as part of the SLS phase.

A more detailed description of the SLS phase is as follows. Herein, the SLS Phase may include: 1) Initiator Sector Sweep (ISS) for training an initiator link, 2) Responder Sector Sweep (RSS) for training a responder link, 3) SSW feedback, and 4) SSW ACK.

The initiator may start the SLS phase by transmitting a frame (or frames) of the ISS.

The responder does not start the transmission of a frame (or frames) of the RSS before the ISS is successfully completed. However, a case where the ISS occurs within a BTI may be excluded.

The initiator may not start the SSW feedback before the RSS phase is successfully completed. However, a case where the RSS occurs within a A-BFT may be excluded. The responder does not start the SSW ACK of the initiator within the A-BFT.

The responder starts the SSW ACK of the initiator immediately after the SSW feedback of the initiator has been successfully completed.

The BF frames being transmitted by the initiator during the SLS phase may include an (EDMG) beacon frame, an SSW frame, and an SSW feedback frame. During the SLS phase, the BF frames being transmitted by the responder may include an SSW frame and an SSW-ACK frame.

If each of the initiator and the responder performs a Transmit Sector Sweep (TXSS) during the SLS phase, at the end of the SLS phase, each of the initiator and the responder may possess its own transmit sector. If the ISS or RSS employs receive sector sweep, the responder or initiator may possess its own receive sector.

An STA does not change its transmission power (or transport power) during sector sweep.

Figure 12:
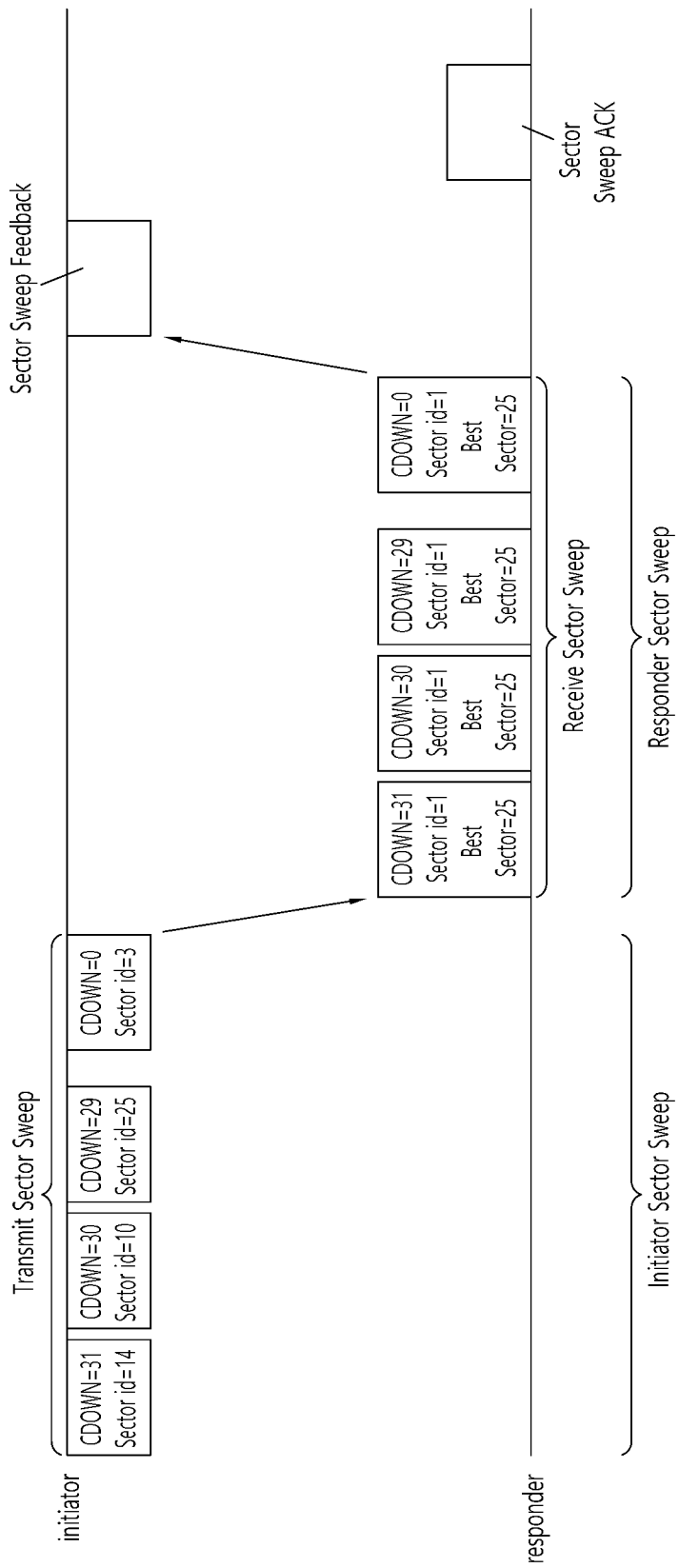
FIG. 12 and FIG. 13 are drawings showing examples of the SLS phase.
Figure 13:
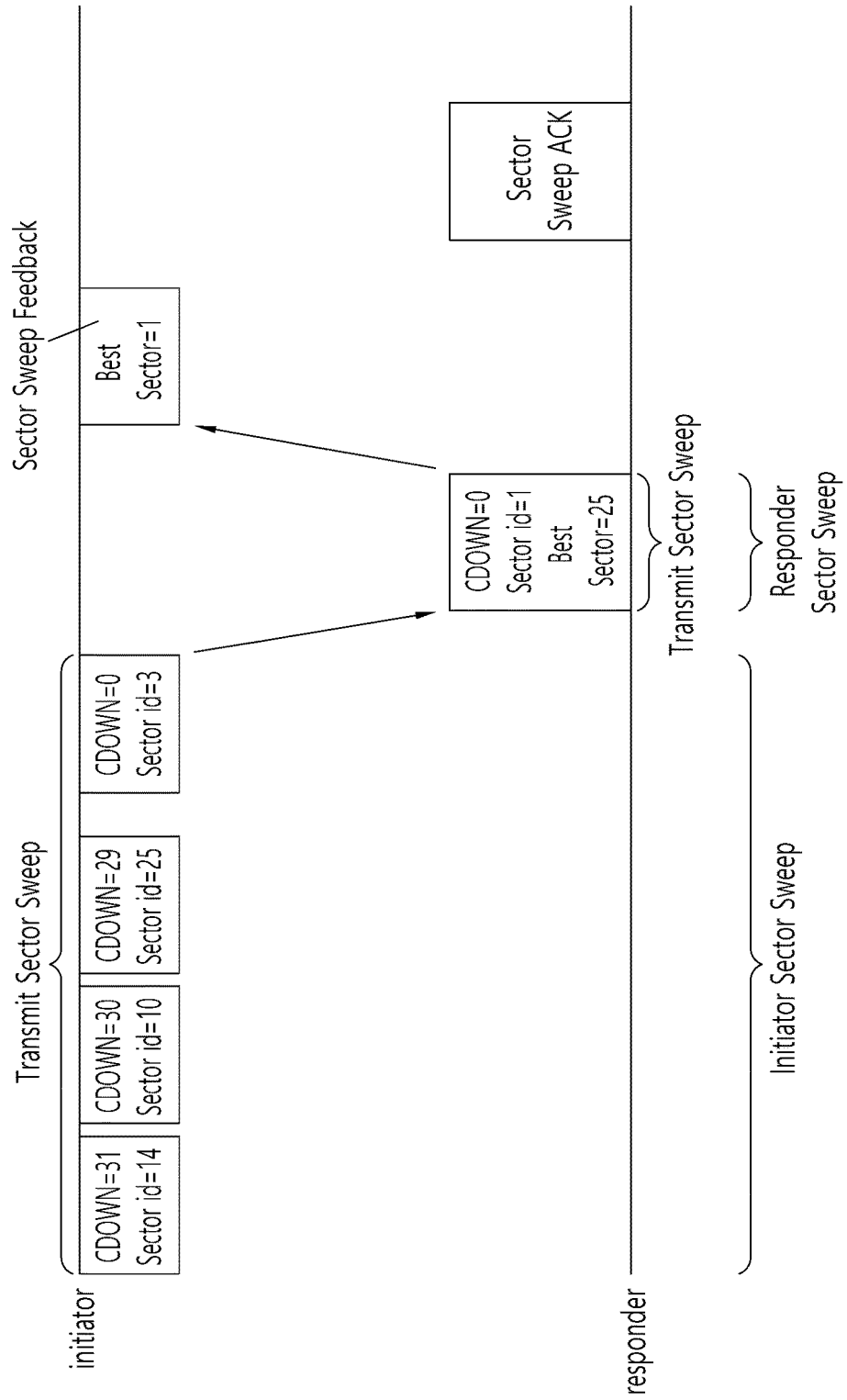

FIG. 12 and FIG. 13 are drawings showing examples of the SLS phase.

Referring to FIG. 12, the initiator has a large number of sectors, and the responder has one transmit sector and receive sector that is used in RSS. Accordingly, the responder transmits SSW frames through the same transmission sector, and, at the same time, the initiator may perform switching of the receive antenna(s).

Referring to FIG. 13, the initiator has a large number of sectors, and the responder has one transmit sector and receive sector that is used in RSS. In this case, the receive training for the initiator may be performed during the BPR phase.

The SLS phase according to the present embodiment may be summarized as follows.

The SLS phase is a protocol performing link detection in a 802.11ay system according to the present embodiment, and, herein, the SLS phase is a beam training method wherein the network nodes contiguously (or consecutively) transmit/receive frames including the same information of a reception channel link by changing only the beam direction, and wherein an indicator (e.g., Signal to Ratio (SNR), Received Signal Strength Indicator (RSSI), and so on) indicating the performance of a receive channel link, among the successfully received frames, selects the best beam direction.

Additionally, the BRP phase may be summarized as follows.

The BRP phase is a protocol finely adjusting the beam direction that may maximize the data transmission rate from the beam direction, which is selected in the SLS phase or by a different means, and the BRP phase may be performed when needed. The BRP phase performs the BRP training by using a BRP frame including beam training information and information reporting the training result, wherein the BRP frame is defined for the BRP protocol. For example, BRP is a beam training method, wherein a BRP frame is transmitted/received by using a beam that is determined during a previous beam training, and wherein beam training is substantially performed by using a beam training sequence, which is included at an end part of a successfully transmitted/received BRP frame. Although the SLS uses a whole frame (or the frame itself) for the beam training, BRP may be different from SLS in that it uses only the beam training sequence.

The above-described SLS phase may be performed within a Beacon Header Interval (BHI) and/or Data Transfer Interval (DTI).

Firstly, the SLS phase that is performed during a BHI may be the same as the SLS phase, which is defined in the 11ad system for its coexistence with the 11ad system.

Subsequently, the SLS phase that is performed during a DTI may be performed in case beamforming training is not performed between an initiator and a responder, or in case a beamforming (BF) link is lost. At this point, if the initiator and the responder are 11ay STAs, the initiator and the responder may transmit a short SSW frame for the SLS phase instead of the SSW frame.

Herein, the short SSW frame may be defined as a frame including a short SSW packet in a Data field of a DMG control PHY or DMG control mode PPDU. At this point, a detailed format of the short SSW packet may be configured differently depending upon the transmission purpose (e.g., I-TXSS, R-TXSS, and so on) of the short SSW packet. The characteristics of the above-described SLS phase may also be applied to all SLS phases that will hereinafter be described.

A Wireless Audio/Video (AV) system that is mentioned in the present specification may include a set-top device and a panel device. In a WAV system, positions of a set-top device and an OLED panel are generically fixed. Accordingly, a wireless channel (or radio channel) of a wireless AV system has the characteristic of a static channel.

The requirements for maintaining an optimized beam in a wireless AV system are as follows.

For example, the wireless AV system shall be capable of managing any instantaneous blockage situation. Accordingly, a wireless AV system capable of performing continuous management of Best Sector combination needs to be designed.

Additionally, the wireless AV system shall be capable of managing any property (or characteristic) changes in an RF device according changes in time/temperature. Accordingly, a WAV system periodically performing beam tracking for an adjacent sector of the Best Sector combination or beam tracking for an adjacent sector of a threshold-based Best Sector combination needs to be designed.

Additionally, the wireless AV system requires a fast recovery management solution in a Beam Broken situation, and the wireless AV system shall also be capable of managing situations where a Best Sector is lost in accordance with any change occurring in a specific channel.

Accordingly, a fast beam broken determination procedure and recovery procedure are being required through the development of a metric that can measure Beamforming quality. Additionally, a periodic or threshold-based search for a new sector combination is required.

Hereinafter, a beam maintenance solution that is optimized for the wireless AV characteristic will be described in detail in the present specification.

Figure 14:
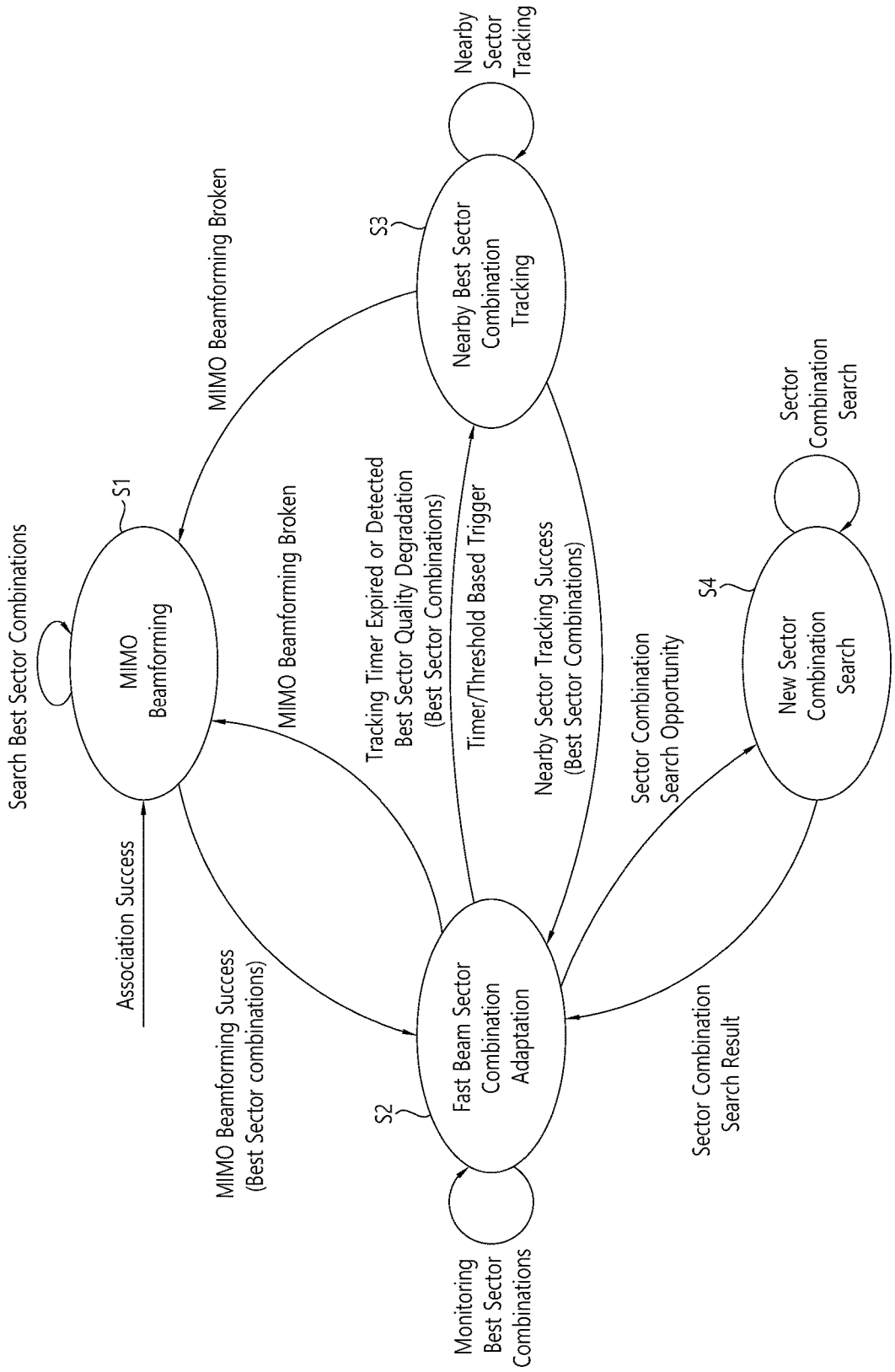
FIG. 14 is a conceptual diagram of a Finite-State Machine (FSM) associated with a wireless device that maintains beamforming in a wireless AV system according to an embodiment of the present disclosure.

FIG. 14 is a conceptual diagram of a Finite-State Machine (FSM) associated with a wireless device that maintains beamforming in a wireless AV system according to an embodiment of the present disclosure.

Referring to FIG. 14, in order to support the method for maintaining beamforming in the wireless AV system, first to fourth states (e.g., S1~S4 of FIG. 14) may be defined.

A first state (S1) of FIG. 14 may be associated with a MIMO beamforming procedure, which is performed after a successful coupling procedure. A wireless device being in the first state (S1) may obtain candidate information that is associated with multiple best candidate sector combinations in the MIMO beamforming procedure.

Herein, it shall be understood that the description of the MIMO beamforming procedure may be substituted based on the descriptions of FIG. 10 to FIG. 13, which are presented above.

When the MIMO beamforming procedure is successfully performed, the state of the wireless device may be shifted from the first state (S1) to a second state (S2).

A second state (S2) of FIG. 14 may be associated with a Fast Beam Sector Combination Adaptation (hereinafter referred to as 'FBSCA') procedure. The FBSCA procedure will be described in more detail later on with reference to FIG. 15 to FIG. 18.

A third state (S3) of FIG. 14 may be associated with a Nearby Best Sector Combination Tracking (hereinafter referred to as 'NBSCT') procedure. The NBSCT procedure will be described in more detail later on with reference to FIG. 19 to FIG. 22.

A fourth state (S4) of FIG. 14 may be associated with a New Sector Combination Search (hereinafter referred to as 'NSCS') procedure. The NSCS procedure will be described in more detail later on with reference to FIG. 23 and FIG. 24.

Figure 15:
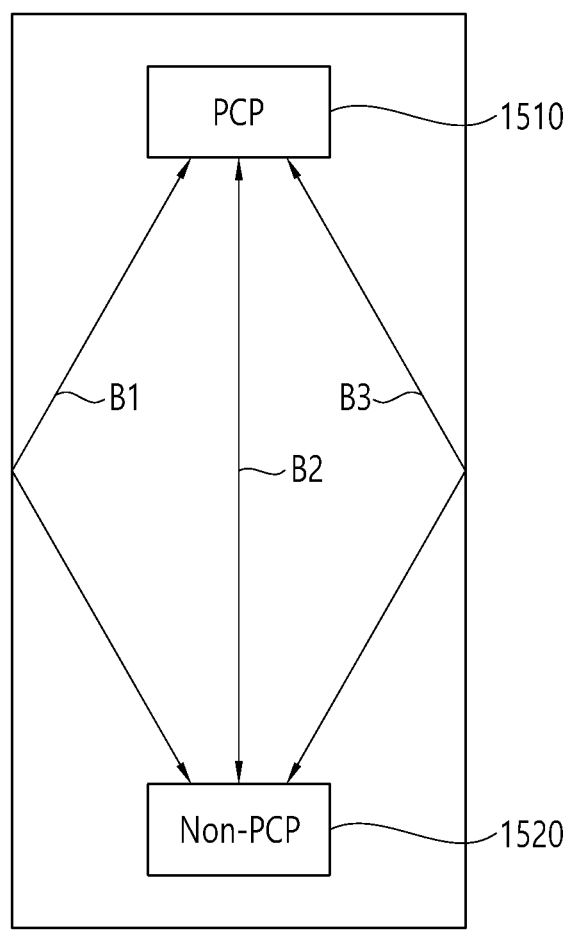
FIG. 15 is a diagram showing a tracking type for an FBSCA procedure according to an embodiment of the present disclosure.

FIG. 15 is a diagram showing a tracking type for an FBSCA procedure according to an embodiment of the present disclosure.

Referring to FIG. 1 to FIG. 15, an FBSCA procedure may be performed between a PCP (1510) and a Non-PCP (1520) of FIG. 15. For example, the PCP (1510) may correspond to a set-top device (e.g., 1100 of FIG. 26) of a wireless AV system, and the Non-PCP (1520) may correspond to a panel device (e.g., 1200 of FIG. 26) of the wireless AV system.

For a clear and concise understanding of the present specification, it may be assumed that multiple candidate sector combinations (e.g., B1~B3 of FIG. 15) are managed for the FBSCA procedure. Based on the above-mentioned assumption, a second candidate sector combination (e.g., B2 of FIG. 15), which is associated with a shortest distance between the PCP (1510) and the Non-PCP (1520), may be the best sector combination.

Among the multiple candidate sector combinations (e.g., B1~B3 of FIG. 15), information on the remaining candidate sector combinations (B1, B3) may be continuously managed in order to respond to blockage.

The multiple candidate sector combinations (e.g., B1~B3 of FIG. 15) being mentioned in the present specification may be understood as a combination of Tx beam and Rx beam between a PCP (e.g., 1510) and a Non-PCP (e.g., 1520), which are positioned in a three-dimensional space.

Figure 16:
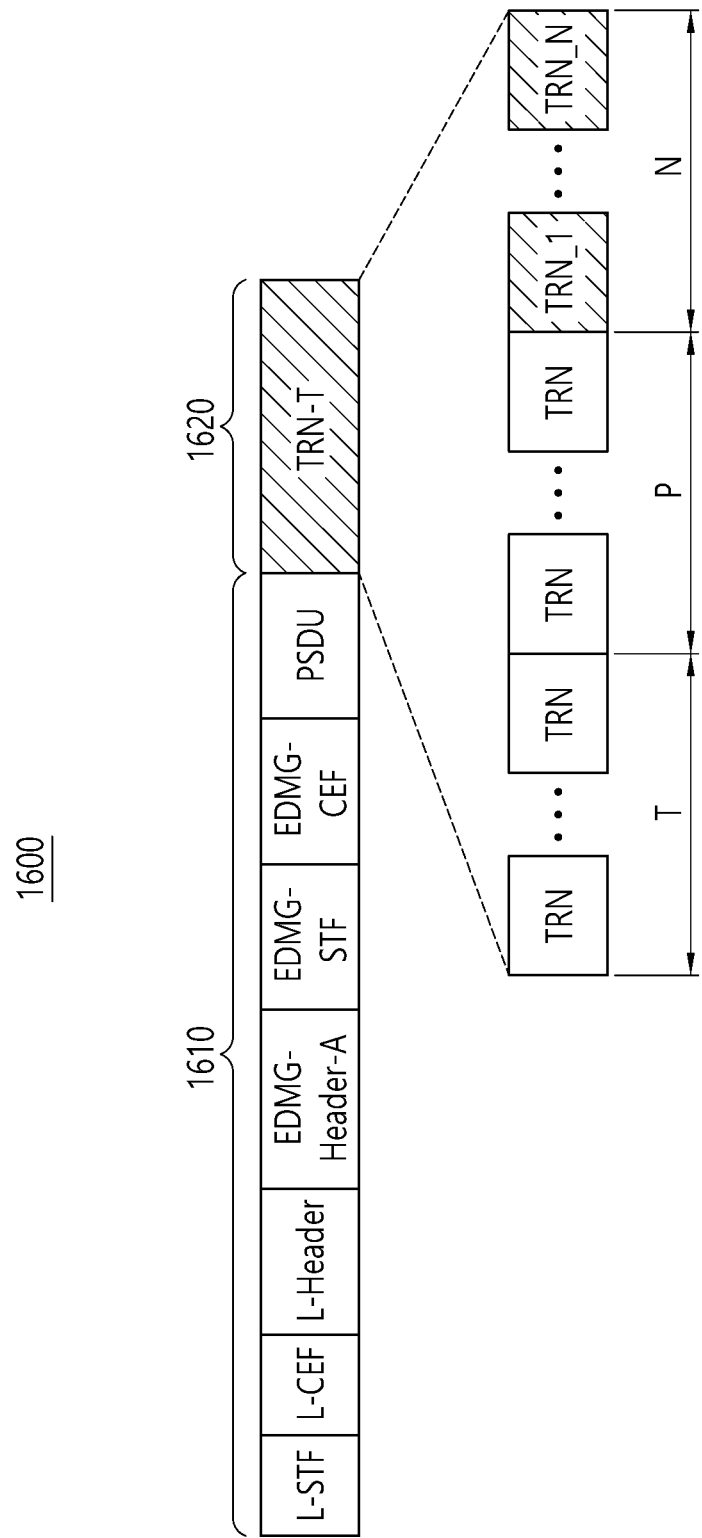
FIG. 16 is a diagram showing a PPDU structure for a method of maintaining beamforming based on an FBSCA procedure in a wireless AV system according to an embodiment of the present disclosure.

FIG. 16 is a diagram showing a PPDU structure for a method of maintaining beamforming based on an FBSCA procedure in a wireless AV system according to an embodiment of the present disclosure.

Referring to FIG. 15 and FIG. 16, the PPDU (1600) according to the present embodiment may include a non-TRN field (1610) and a TRN-T field (1620).

For example, the non-TRN field (1610) may correspond to the respective fields (910~980) of FIG. 9. In this case, the non-TRN field (1610) may be transmitted based on a second candidate sector combination (B2), which is the best sector combination.

Additionally, the TRN-T field (1620) may include a plurality of TRN fields.

The TRN-T field (1620) according to the present embodiment may be used for a periodic management of multiple Candidate Sector Combinations that are obtained based on an initial beamforming procedure.

Meanwhile, the TRN-T field (1620) may be applied to all data frames for the maintenance of beamforming in the wireless AV system.

Meanwhile, N number of TRN fields (e.g., TRN_1~TRN_N of FIG. 16) included in the TRN-T field (1620) may be used for multiple candidate sector combinations (e.g., B1~B3 of FIG. 15).

Meanwhile, the N number of TRN fields (e.g., TRN_1~TRN_N of FIG. 16) included in the TRN-T field (1620) may be associated with a number of the multiple candidate sector combinations (e.g., B1~B3 of FIG. 15), which are managed for the PCP (1510) and the Non-PCP (1520).

For example, among the N number of TRN fields (e.g., TRN_1~TRN_N of FIG. 16), a first TRN field (e.g., TRN_1 of FIG. 16) may be transmitted along a direction of the first candidate sector combination (B1). Among the N number of TRN fields (e.g., TRN_1~TRN_N of FIG. 16), a second TRN field (e.g., TRN_2 of FIG. 16) may be transmitted along a direction of the second candidate sector combination (B2).

Among the N number of TRN fields (e.g., TRN_1~TRN_N of FIG. 16), a third TRN field (e.g., TRN_3 of FIG. 16) may be transmitted along a direction of the third candidate sector combination (B3). For reference, T number of TRN fields and P number of TRN field included in the TRN-T field (1620) may be omitted as needed.

Figure 17:
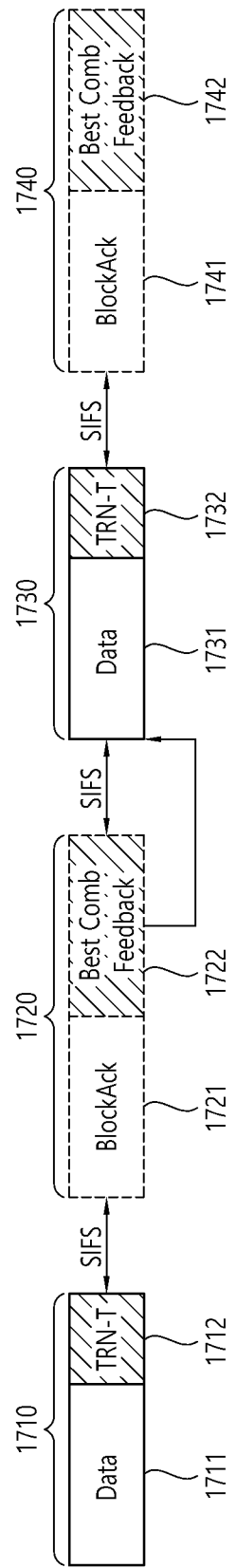
FIG. 17 is a diagram showing a frame being exchanged in an FBSCA procedure according to an embodiment of the present disclosure.

FIG. 17 is a diagram showing a frame being exchanged in an FBSCA procedure according to an embodiment of the present disclosure.

Referring to FIG. 15 to FIG. 17, a first frame (1710) may include a first data part (1711) and a first TRN-T part (1712). For example, the first data part (1711) may be transmitted based on the best sector combination (e.g., B2 of FIG. 15) among the multiple candidate sector combinations (e.g., B1~B3 of FIG. 15).

Additionally, the first TRN-T part (1712) may be transmitted for managing the multiple candidate sector combinations (e.g., B1~B3 of FIG. 15). After completing the transmission of the first frame (1710), when an SIFS is passed, a second frame (1720) may be transmitted.

The second frame (1720) may include a first block ACK part (1721) and a first best combination feedback part (1722). For example, the first block ACK part (1721) may include information for notifying whether or not the first data part (1711) is successfully received.

Additionally, the first best combination feedback part (1722) may include candidate beam feedback information corresponding to response information for N number of TRN fields (e.g., TRN_1~TRN_N of FIG. 16), which are included in the TRN-T field (e.g., 1620 of FIG. 16). For example, the candidate beam feedback information may be information associated with the multiple candidate sector combinations (e.g., B1~B3 of FIG. 15).

For a clear and concise understanding of FIG. 17, it may be assumed that the best sector combination is switched (or changed) based on the candidate beam feedback information, which is included in the first best combination feedback part (1722).

After completing the transmission of the second frame (1720), when an SIFS is passed, a third frame (1730) may be transmitted.

The third frame (1730) may include a second data part (1731) and a second TRN-T part (1732). For example, the second data part (1731) may be transmitted based on the switched (or changed) best sector combination (e.g., B1 of FIG. 15).

Additionally, the second TRN-T part (1732) may be transmitted for managing the multiple candidate sector combinations (e.g., B1~B3 of FIG. 15). After completing the transmission of the third frame (1730), when an SIFS is passed, a fourth frame (1740) may be transmitted.

The fourth frame (1740) may include a second block ACK part (1741) and a second best combination feedback part (1742). For example, the second block ACK part (1741) may include information for notifying whether or not the second data part (1731) is successfully received.

Additionally, the second best combination feedback part (1742) may include candidate beam feedback information corresponding to response information for N number of TRN fields (e.g., TRN_1~TRN_N of FIG. 16), which are included in the TRN-T field (e.g., 1620 of FIG. 16).

For example, the candidate beam feedback information may be information associated with the channel status for each of the multiple candidate sector combinations (e.g., B1~B3 of FIG. 15).

Figure 18:
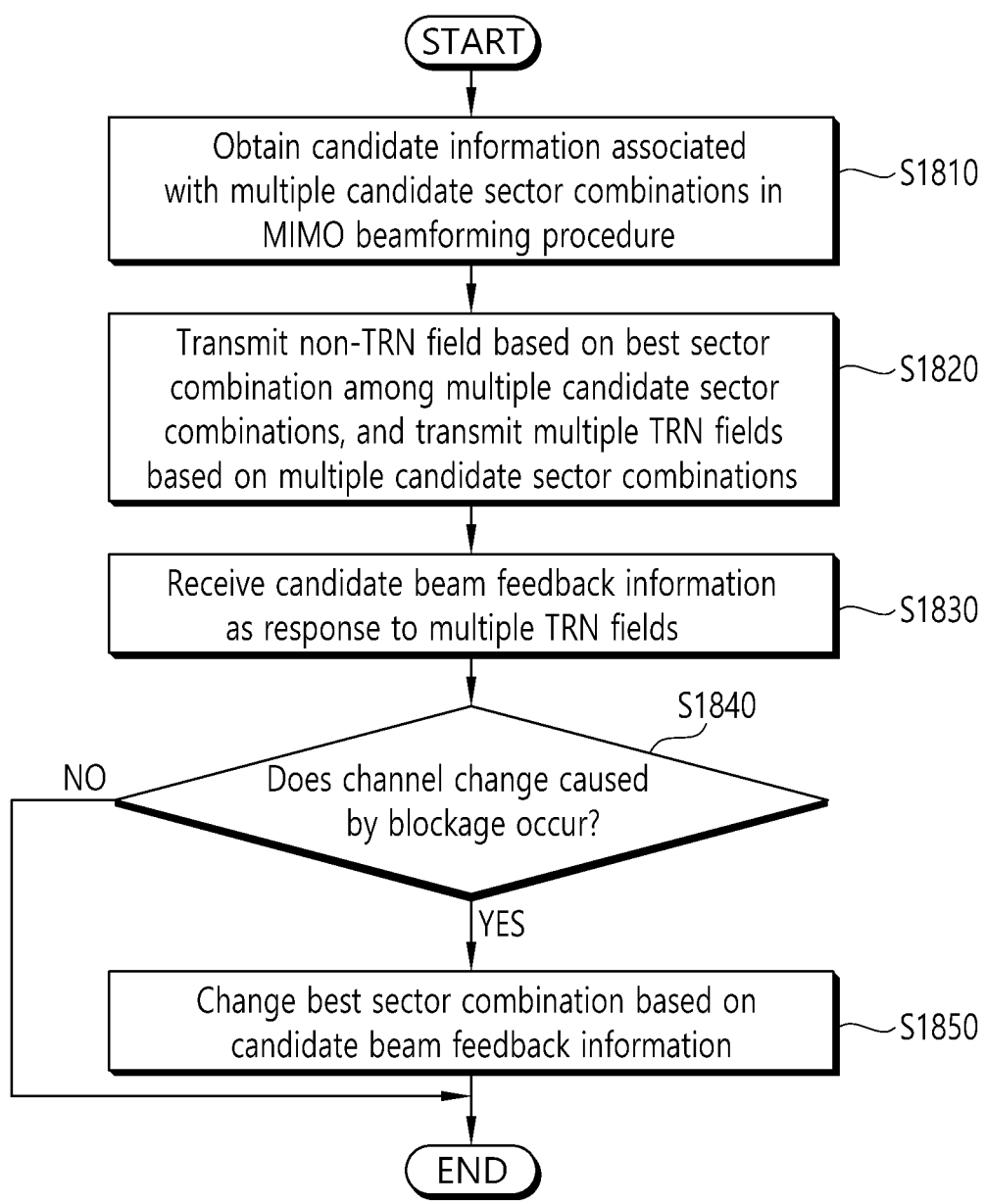
FIG. 18 is a diagram being associated with a first procedure for maintaining beamforming in a wireless AV system according to an embodiment of the present disclosure.

FIG. 18 is a diagram being associated with a first procedure for maintaining beamforming in a wireless AV system according to an embodiment of the present disclosure.

Herein, a first procedure for maintaining beamforming in the wireless AV system that is mentioned in step S1810 to step S1850 corresponds to the Fast Beam Sector Combination Adaptation (FBSCA) procedure of FIG. 14.

Figure 26:
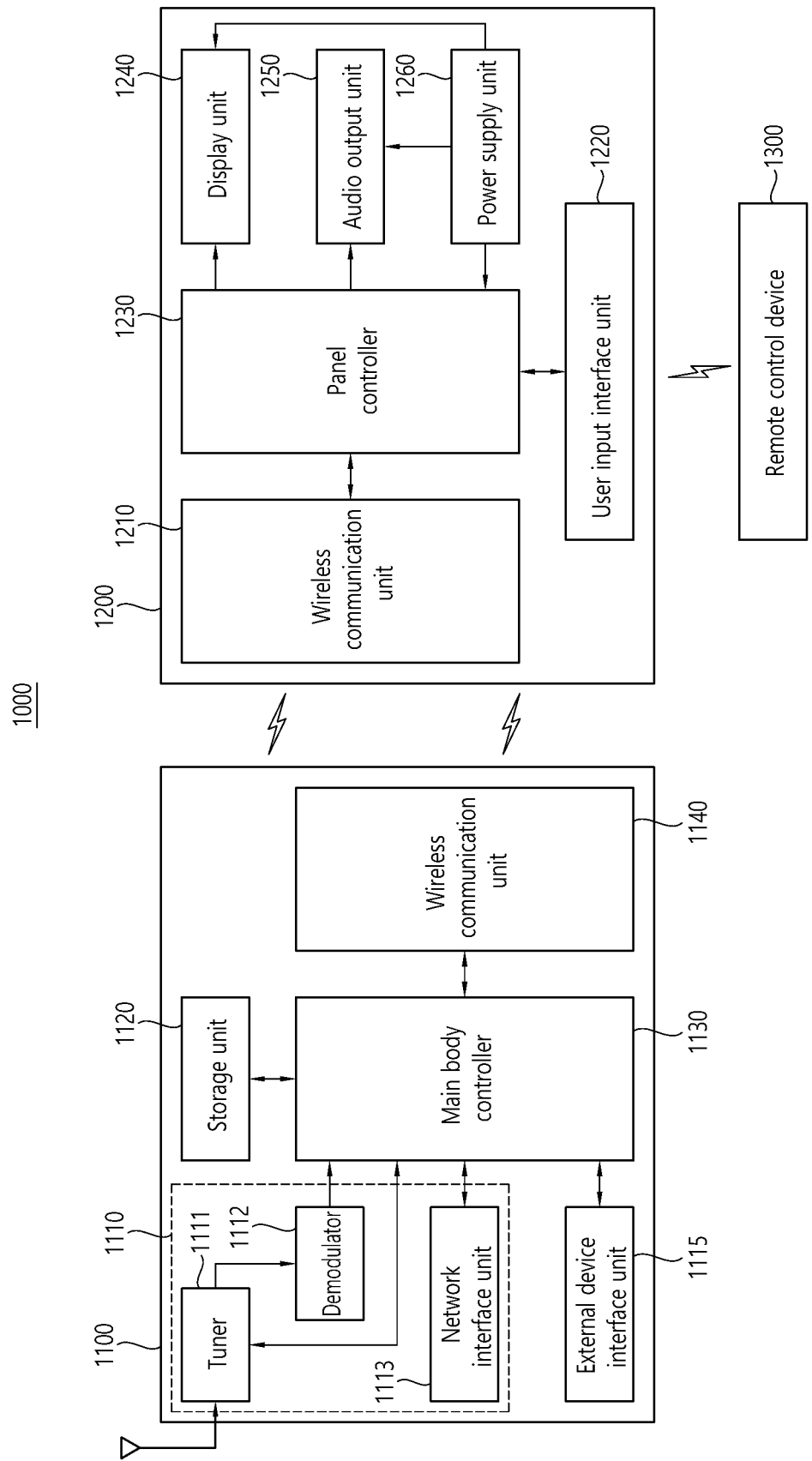
FIG. 26 is a block diagram showing an exemplary application of a wireless system for maintaining beamforming in a wireless AV system according to the present embodiment.

A first wireless device mentioned in FIG. 18 may correspond to a set-top device (e.g., 1100 of FIG. 26) of a wireless AV system (e.g., 1000 of FIG. 26). And, a second wireless device mentioned in FIG. 18 may correspond to a panel device (e.g., 1200 of FIG. 26) of the wireless AV system (e.g., 1000 of FIG. 26).

Referring to FIG. 15 to FIG. 18, in step S1810, the first wireless device may obtain candidate information associated with multiple candidate sector combinations (e.g., B1~B3 of FIG. 15) by performing a MIMO beamforming procedure with a second device.

Herein, it shall be understood that the detailed description of the MIMO beamforming procedure may be substituted based on the descriptions of FIG. 10 to FIG. 13, which are presented above.

In step S1820, the first wireless device may transmit a non-TRN field (e.g., 1610 of FIG. 16) to the second wireless device, based on the best sector combination (e.g., B2 of FIG. 15) among the multiple candidate sector combinations (e.g., B1~B3 of FIG. 15).

Additionally, the first wireless device may transmit a plurality of TRN fields included in the TRN-T field (1620) based on the multiple candidate sector combinations (e.g., B1~B3 of FIG. 15). Herein, a number (e.g., '3') of the plurality of TRN fields included in the TRN-T field (1620) may be associated with the multiple candidate sector combinations (e.g., B1~B3 of FIG. 15).

In step S1830, the first wireless device may receive candidate beam feedback information from the second wireless device as a response to the plurality of TRN fields. For example, the candidate beam feedback information may be information associated with the channel status for each of the multiple candidate sector combinations (e.g., B1~B3 of FIG. 15).

In step S1840, the first wireless device may determine whether or not a channel change caused by a blockage occurs based on the candidate beam feedback information.

If there is no channel change caused by blockage, the procedure is ended. If there is a channel change caused by blockage, the procedure carries on to step S1850.

In step S1850, the first wireless device may switch the existing best sector combination (e.g., B2 of FIG. 15) to a new best sector combination (e.g., B1 of FIG. 15) based on the candidate beam feedback information.

Additionally, by performing continuous management of the best sector combination, the wireless AV system to which the embodiment of FIG. 15 to FIG. 18 is applied may ensure continuity in video data while quickly counteracting to an instant blockage situation.

Figure 19:
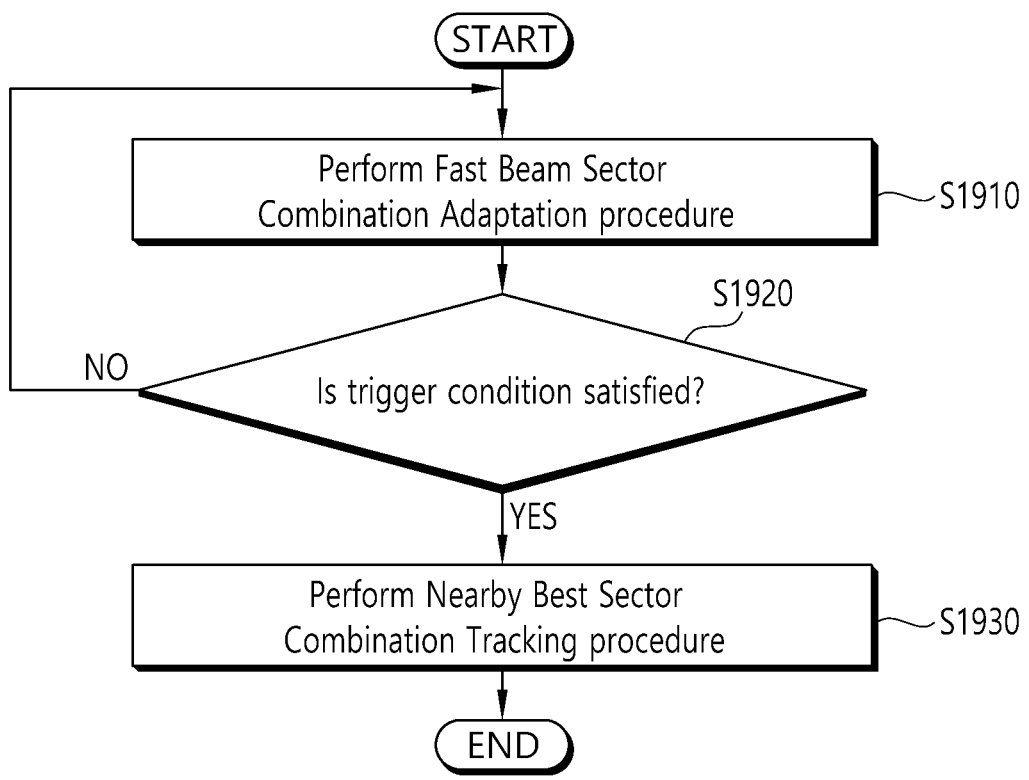
FIG. 19 is a diagram being associated with a second procedure for maintaining beamforming in a wireless AV system according to an embodiment of the present disclosure.

FIG. 19 is a diagram being associated with a second procedure for maintaining beamforming in a wireless AV system according to an embodiment of the present disclosure.

A first wireless device mentioned in FIG. 19 may correspond to a set-top device (1100 of FIG. 26) of a wireless AV system (e.g., 1000 of FIG. 26). And, a second wireless device mentioned in FIG. 19 may correspond to a panel device (e.g., 1200 of FIG. 26) of the wireless AV system (e.g., 1000 of FIG. 26).

Referring to FIG. 18 and FIG. 19, in step S1910, the first wireless device may perform the Fast Beam Sector Combination Adaptation (FBSCA) procedure. Herein, the Fast Beam Sector Combination Adaptation (FBSCA) procedure of step S1910 may be understood based on the description of the above-described step S1810 to step S1850.

In step S1920, the first wireless device may determine whether or not a trigger condition enabling the wireless device to be switched to the second procedure and operated accordingly is satisfied.

Herein, the second procedure for maintaining beamforming in the wireless AV system, which is mentioned in step S1920, corresponds to the above-described Nearby Best Sector Combination Tracking (NBSCT) of FIG. 14.

The second procedure for maintaining beamforming in the wireless AV system according to the present embodiment may be understood as a beam tracking procedure for responding to any change (or switch) in beam direction according to property changes occurring in a beam-related analog device that are caused by changes in time/temperature.

For example, the trigger condition may be implemented based on a timer, which is based on whether or not a tracking timer is expired. For example, if the tracking timer is expired, the first wireless device may determine that the trigger condition, which enables the first wireless device to shift (or switch) from the first procedure according to step S1910 to the second procedure (i.e., which enables the first wireless device to shift (or switch) from the second state (S2) to the third state (S3) of FIG. 14) and to operate accordingly, is satisfied.

Alternatively, the trigger condition may be implemented based on a threshold value that is based on the presence or absence of detected best sector quality degradation. As an example, when the best sector quality is degraded to a predetermined value or lower, the first wireless UE (or device) may determine that the trigger condition, which enables the first wireless device to shift (or switch) from the first procedure according to step S1910 to the second procedure (i.e., which enables the first wireless device to shift (or switch) from the second state (S2) to the third state (S3) of FIG. 14) and to operate accordingly, is satisfied.

If the trigger condition is not satisfied, the procedure carries on to step S1910. Meanwhile, if the trigger condition is satisfied, the procedure carries on to step S1930.

In step S1930, in order to maintain beamforming with the second wireless device, the first wireless device may perform a Nearby Best Sector Combination Tracking (NBSCT) procedure. The Nearby Best Sector Combination Tracking (NBSCT) of step S1930 will hereinafter be described in detail with reference to FIG. 20 to FIG. 22.

Figure 20:
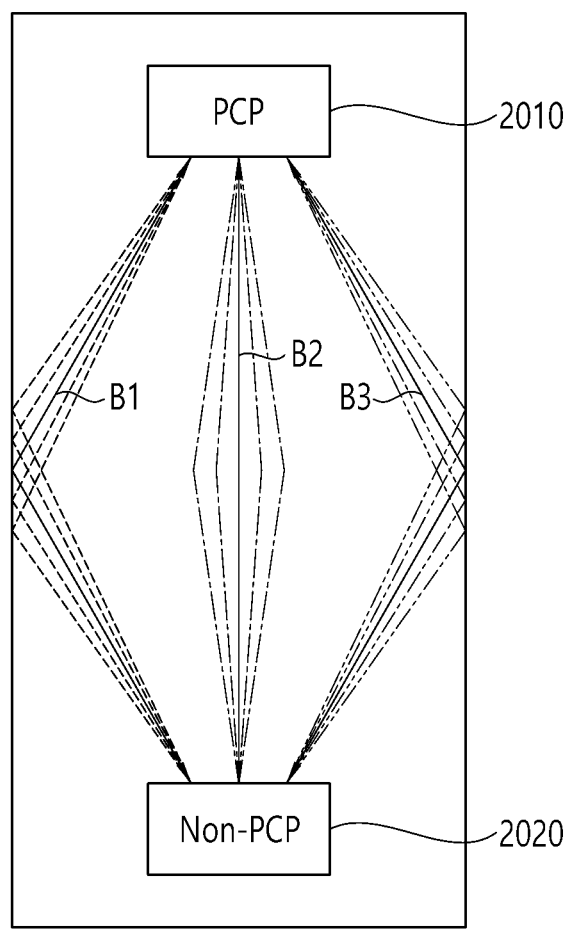
FIG. 20 is a diagram showing a tracking type for an NBSCT procedure according to an embodiment of the present disclosure.

FIG. 20 is a diagram showing a tracking type for an NBSCT procedure according to an embodiment of the present disclosure. Referring to FIG. 1 to FIG. 20, an NBSCT procedure may be performed between a PCP (2010) and a Non-PCP (2020) of FIG. 20.

For example, the PCP (2010) may correspond to a set-top device (e.g., 1100 of FIG. 26) of a wireless AV system, and the Non-PCP (2020) may correspond to a panel device (e.g., 1200 of FIG. 26) of the wireless AV system.

For a clear and concise understanding of FIG. 20, it may be assumed that multiple candidate sector combinations (e.g., B1~B3 of FIG. 20) are managed by performing the NBSCT procedure. In this case, a second candidate sector combination (e.g., B2 of FIG. 20), which is associated with a shortest distance between the PCP (2010) and the Non-PCP (2020), may be the best sector combination.

Additionally, if a trigger condition for a second procedure is satisfied, the PCP (2010) may perform the NBSCT procedure for managing multiple nearby beam combinations (e.g., N1, N2, N3 of FIG. 20) of multiple candidate sector combinations (e.g., B1~B3 of FIG. 20).

For example, multiple first nearby beam combinations (e.g., N1 of FIG. 20) of a first candidate sector combination (e.g., B1 of FIG. 20) may be managed. And, multiple second nearby beam combinations (e.g., N2 of FIG. 20) of a second candidate sector combination (e.g., B2 of FIG. 20) may be managed. Furthermore, multiple third nearby beam combinations (e.g., N3 of FIG. 20) of a third candidate sector combination (e.g., B3 of FIG. 20) may be managed.

According to the present embodiment, in order to respond to any change according to property changes occurring in an analog device, information on the multiple nearby beam combinations (e.g., N1, N2, N3 of FIG. 20) may be continuously managed even after the trigger condition is satisfied.

The multiple candidate sector combinations (e.g., B1~B3 of FIG. 20) and the multiple nearby beam combinations (e.g., N1, N2, N3 of FIG. 20) being mentioned in FIG. 20 may be understood as a combination of Tx beam and Rx beam between a PCP (e.g., 2010) and a Non-PCP (e.g., 2020), which are positioned in a three-dimensional space.

Figure 21:
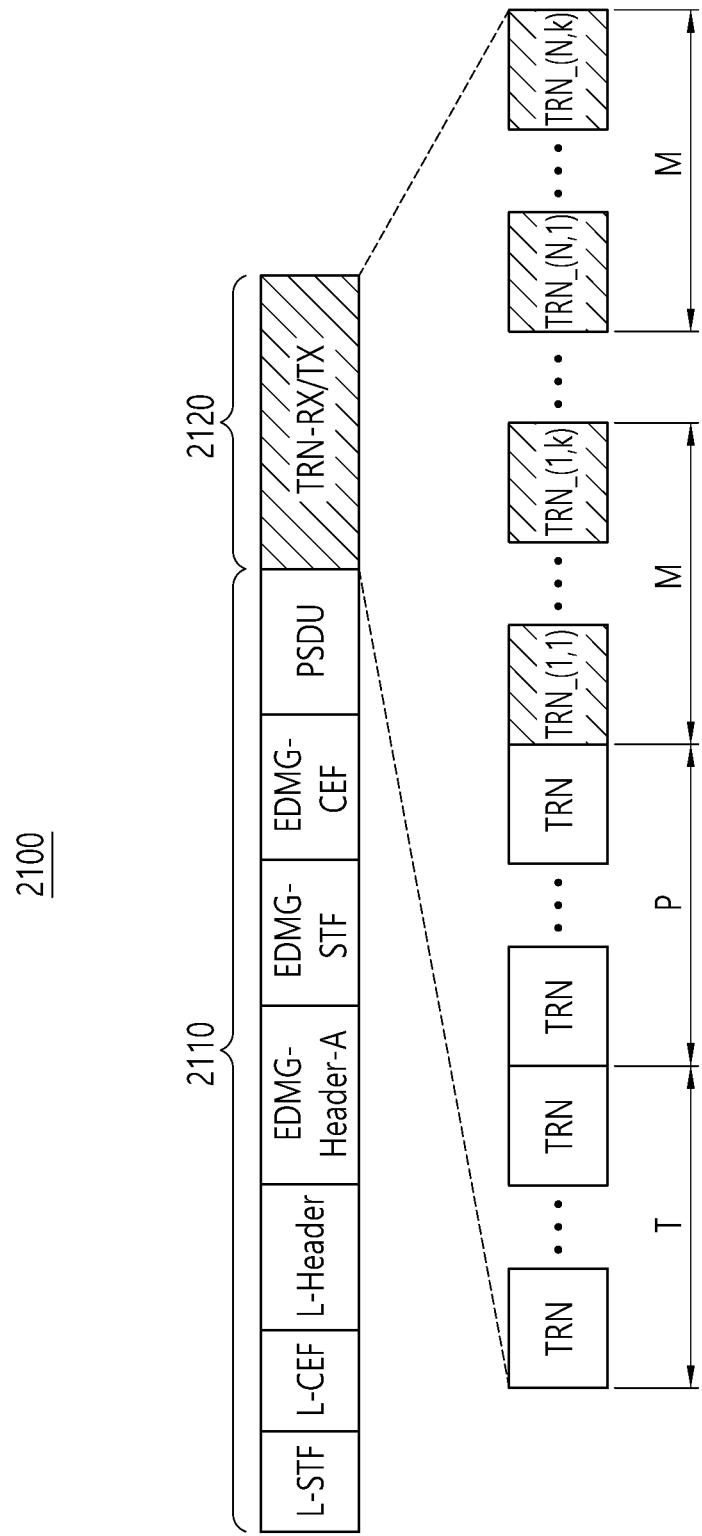
FIG. 21 is a diagram showing a PPDU structure for a method of maintaining beamforming based on an NBSCT procedure in a wireless AV system according to an embodiment of the present disclosure.

FIG. 21 is a diagram showing a PPDU structure for a method of maintaining beamforming based on an NBSCT procedure in a wireless AV system according to an embodiment of the present disclosure.

Referring to FIG. 1 to FIG. 21, a PPDU (2100) according to the present embodiment may include a non-TRN field (2110) and a TRN-RX/TX field (2120).

For example, the non-TRN field (2110) may correspond to the respective fields (910~980) of FIG. 9. In this case, the non-TRN field (2110) may be transmitted based on a second candidate sector combination (B2), which is the best sector combination.

Additionally, the TRN-RX/TX field (2120) may include a plurality of TRN fields. The TRN-RX/TX field (2120) according to the present embodiment may be used for the management of multiple nearby beam combinations (e.g., N1, N2, N3 of FIG. 20) that are obtained based on a Nearby Best Sector Combination Tracking (NBSCT) procedure.

According to the present embodiment, a number of the multiple candidate sector combinations that are managed by the Fast Beam Sector Combination Adaptation (FBSCA) procedure may be expressed as N. Herein, N may be equal to 16.

Additionally, a number of the multiple nearby beam combinations that are managed by the Nearby Best Sector Combination Tracking (NBSCT) procedure may be expressed as K. Herein, K may be equal to 8.

In this case, a number of TRN-RX/TX fields (2120), which are used for the management of the multiple nearby beam combinations (e.g., N1, N2, N3 of FIG. 20) for the Nearby Best Sector Combination Tracking (NBSCT) procedure, may include 16*8*8=1024 TRN fields (e.g., TRN (1,1)~TRN (1,K), ..., TRN (N,1)~TRN (N,K) of FIG. 21).

For reference, T number of TRN fields and P number of TRN field included in the TRN-RX/TX field (2120) may be omitted as needed.

Figure 22:
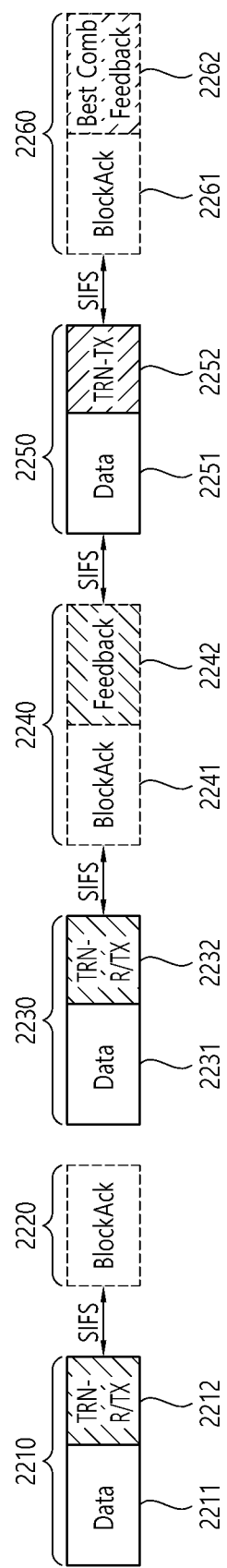
FIG. 22 is a diagram showing a frame being exchanged in an NBSCT procedure according to an embodiment of the present disclosure.

FIG. 22 is a diagram showing a frame being exchanged in an NBSCT procedure according to an embodiment of the present disclosure.

Referring to FIG. 19 to FIG. 22, a first frame (2210) may include a first data part (2211) and a first TRN-R/TX part (2212). For example, the first data part (2211) may be transmitted based on the best sector combination (e.g., B2 of FIG. 20) among the multiple candidate sector combinations (e.g., B1~B3 of FIG. 20).

Additionally, the first TRN-R/TX part (2212) may be transmitted for managing the multiple candidate sector combinations (e.g., B1~B3 of FIG. 20) and also the multiple nearby beam combinations (e.g., N1, N2, N3 of FIG. 20). After completing the transmission of the first frame (2210), when an SIFS is passed, a second frame (2220) may be transmitted.

The second frame (2220) may include a first block ACK part for notifying whether or not the first data part (2211) is successfully received.

Subsequently, a third frame (2230) may include a second data part (2231) and a second TRN-R/TX part (2232).

For example, the second data part (2231) may be transmitted based on the best sector combination (e.g., B2 of FIG. 20) among the multiple candidate sector combinations (e.g., B1~B3 of FIG. 20).

Additionally, the second TRN-R/TX part (2232) may be transmitted for managing the multiple candidate sector combinations (e.g., B1~B3 of FIG. 20) and also the multiple nearby beam combinations (e.g., N1, N2, N3 of FIG. 20). After completing the transmission of the third frame (2230), when an SIFS is passed, a fourth frame (2240) may be transmitted.

The fourth frame (2240) may include a second block ACK part (2241) and a second feedback part (2242). For example, the second block ACK part (2241) may include information for notifying whether or not the second data part (2231) is successfully received.

Additionally, the second feedback part (2242) may include nearby beam feedback information corresponding to response information for the first TRN-R/TX part (2212) and the second TRN-R/TX part (2232). For example, the nearby beam feedback information may be information associated with the channel status for the multiple candidate sector combinations (e.g., B1~B3 of FIG. 20) and the channel status for the multiple nearby beam combinations (e.g., N1, N2, N3 of FIG. 20).

According to the present embodiment, the second feedback part (2242) may be used for determining whether or not switching (or change) occurs to a (new) best sector combination (e.g., B1 of FIG. 20), which is switched (or changed) from the existing best sector combination (e.g., B2 of FIG. 20).

Additionally, the second feedback part (2242) may be used for selecting one nearby beam among the multiple nearby beam combinations (e.g., N1 of FIG. 20), which are associated with the switched (or changed) best sector combination (e.g., B1 of FIG. 20). After completing the transmission of the fourth frame (2240), when an SIFS is passed, a fifth frame (2250) may be transmitted.

Subsequently, the fifth frame (2250) may include a third data part (2251) and a third TRN-TX part (2252).

For example, the third data part (2251) may be transmitted based on nearby beam combinations (e.g., one of N1 of FIG. 20) of a (new) best sector combination (e.g., B1 of FIG. 20), which is switched (or changed) from the existing best sector combination (e.g., B2 of FIG. 20).

Additionally, the first TRN-TX part (2252) may be transmitted for managing the multiple candidate sector combinations (e.g., B1~B3 of FIG. 20). In this case, it shall be understood that the first TRN-TX part (2252) is used for the FBSCA procedure. After completing the transmission of the fifth frame (2250), when an SIFS is passed, a sixth frame (2260) may be transmitted.

Subsequently, the sixth frame (2260) may include a third block ACK part (2261) and a first best combination feedback part (2262). The third block ACK part (2261) may include information for notifying whether or not the third data part (2251) is successfully received.

Additionally, the first best combination feedback part (2262) may include candidate beam feedback information corresponding to response information for N number of TRN fields, which are included in the TRN-T field. For example, the candidate beam feedback information may be information that is associated with multiple candidate sector combinations (e.g., B1~B3 of FIG. 22).

Furthermore, a wireless AV system to which the embodiment of FIG. 19 to FIG. 22 is applied is capable of performing real-time operation, which may be applied in multiple PPDU units according to a number of sectors that are to be tracked by the wireless AV system.

Figure 23:
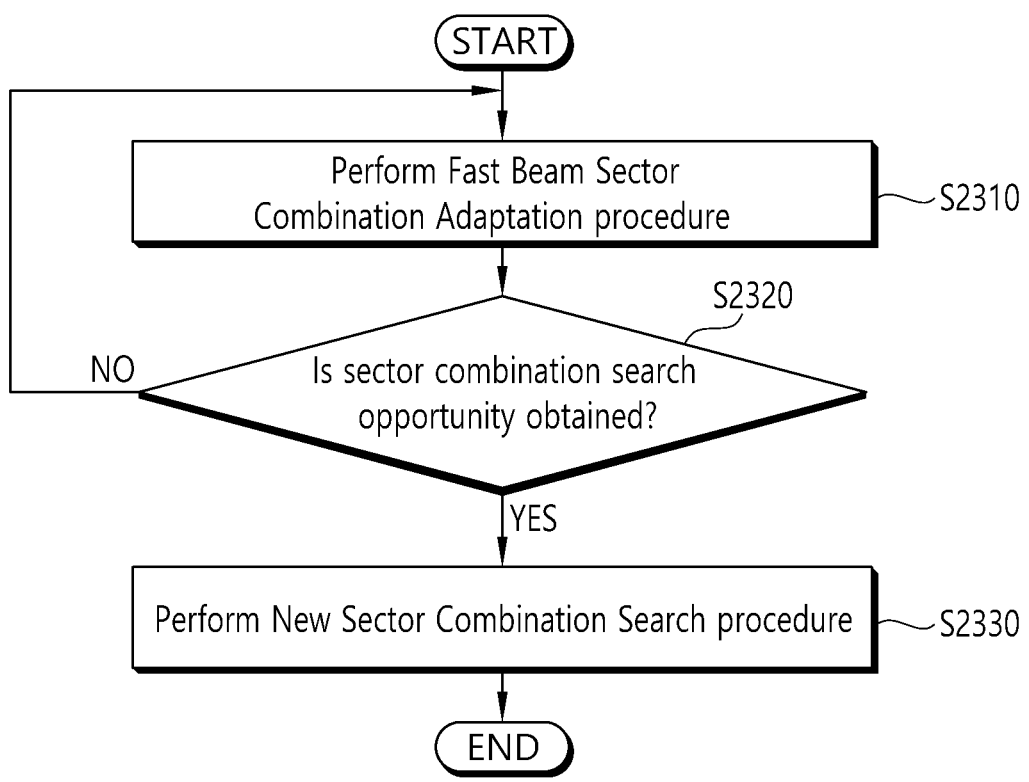
FIG. 23 is a diagram being associated with a third procedure for maintaining beamforming in a wireless AV system according to an embodiment of the present disclosure.

FIG. 23 is a diagram being associated with a third procedure for maintaining beamforming in a wireless AV system according to an embodiment of the present disclosure.

A first wireless device mentioned in FIG. 23 may correspond to a set-top device (1100 of FIG. 26) of a wireless AV system (e.g., 1000 of FIG. 26). And, a second wireless device mentioned in FIG. 23 may correspond to a panel device (e.g., 1200 of FIG. 26) of the wireless AV system (e.g., 1000 of FIG. 26).

Referring to FIG. 23, in step S2310, the first wireless device may perform the Fast Beam Sector Combination Adaptation (FBSCA) procedure. Herein, the Fast Beam Sector Combination Adaptation (FBSCA) procedure of step S2310 may be understood based on the description of the above-described step S1810 to step S1850.

In step S2320, the first wireless device may determine whether or not a Sector Combination Search Opportunity is obtained. For example, the Sector Combination Search Opportunity may be implemented based on TDD.

Meanwhile, if the Sector Combination Search Opportunity is not obtained, the procedure carries on to step S2310. And, if the Sector Combination Search Opportunity is obtained, the procedure carries on to step S2330.

In step S2330, the first wireless device may perform a New Sector Combination Search (NSCS) procedure in its relationship with the second wireless device. For example, the NSCS procedure may be performed by using the TDD scheme together with the FBSCA procedure.

Meanwhile, the NSCS procedure may be performed over multiple opportunities. More specifically, MIMO beamforming may be segmented based on a length of an opportunity.

Additionally, based on a result of the NSCS procedure, which is performed over multiple opportunities, reordering of a best sector combination set may be performed.

Figure 24:
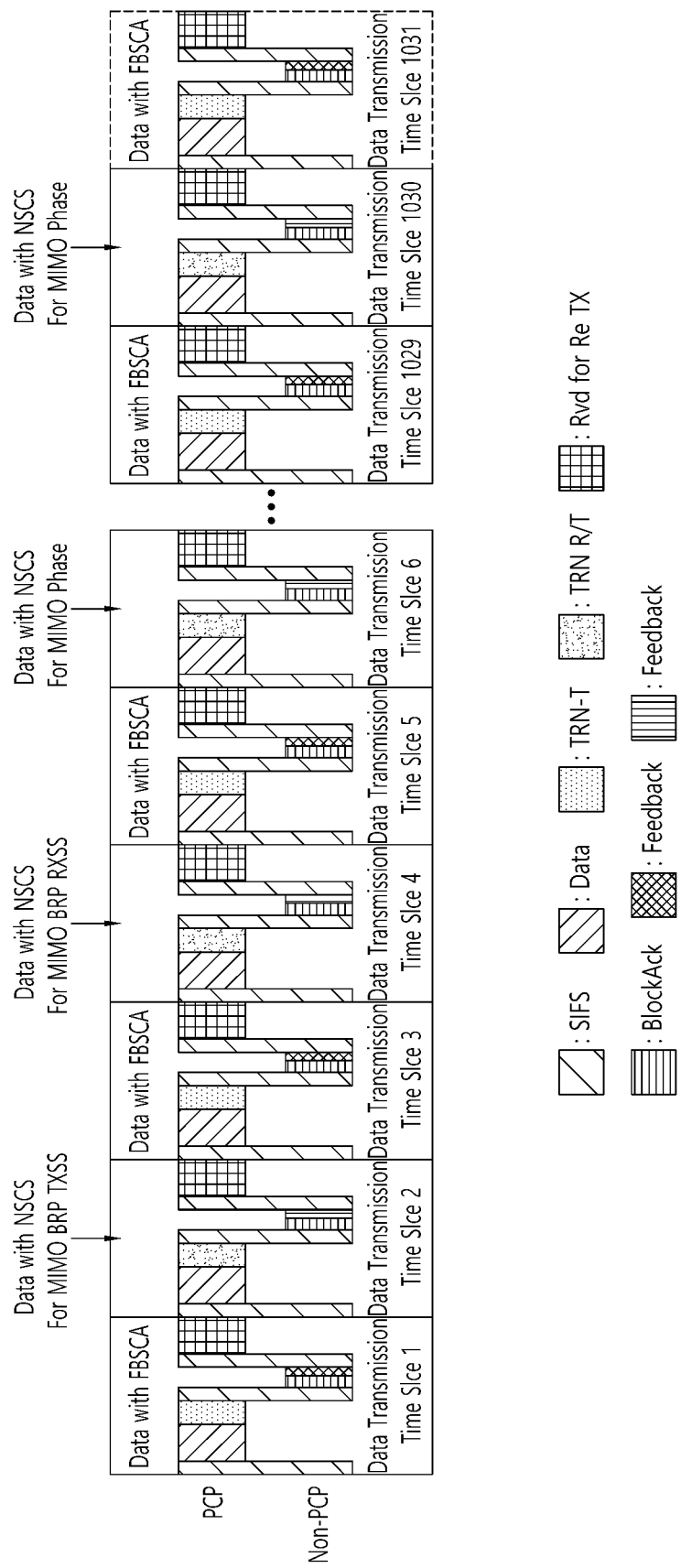
FIG. 24 shows a process of updating a new sector combination through an NSCS procedure according to the present embodiment.

FIG. 24 shows a process of updating a new sector combination through an NSCS procedure according to the present embodiment. Referring to FIG. 24, the process of updating a new sector combination through an NSCS procedure may be performed based on 515 ms.

Additionally, as described above, the NSCS procedure according to the present embodiment may be performed together with the FBSCA procedure over multiple data transmission time slices (Data Transmission TimeSlice_1~Data Transmission TimeSlice_1031) by using the TDD scheme. For example, each data transmission time slice may have a time length of 0.5 ms.

For example, a first data transmission time slice (Data Transmission TimeSlice_1) may be associated with the FBSCA procedure. At this point, a TRN-T that is included in the first data transmission time slice (Data Transmission TimeSlice_1) has a length of approximately 1 us.

Additionally, a second data transmission time slice (Data Transmission TimeSlice_2) may be associated with the NSCS procedure for a MIMO BRP TXSS. At this point, a TRN-T that is included in the second data transmission time slice (Data Transmission TimeSlice_2) has a length of approximately 5 us based on 64 sectors.

Meanwhile, a third data transmission time slice (Data Transmission TimeSlice_3) may be associated with the FBSCA procedure. At this point, a TRN-T that is included in the third data transmission time slice (Data Transmission TimeSlice_3) has a length of approximately 1 us.

Additionally, a fourth data transmission time slice (Data Transmission TimeSlice_4) may be associated with the NSCS procedure for a MIMO BRP RXSS. At this point, a TRN-T that is included in the fourth data transmission time slice (Data Transmission TimeSlice_4) has a length of approximately 5 us based on 64 sectors.

Meanwhile, a fifth data transmission time slice (Data Transmission TimeSlice_5) may be associated with the FBSCA procedure. At this point, a TRN-T that is included in the fifth data transmission time slice (Data Transmission TimeSlice_5) has a length of approximately 1 us.

Additionally, a sixth data transmission time slice (Data Transmission TimeSlice_6) may be associated with the NSCS procedure for a MIMO phase. At this point, a TRN-R/T that is included in the sixth data transmission time slice (Data Transmission TimeSlice_6) has a length of approximately 10 us.

More specifically, in a situation where K=16 and J=16, a total number of sector combinations is equal to 65,536. And, in case transmission is performed in segmented units of 128 sector combinations, the TRN-R/T having the length of approximately 10 us is transmitted 512 times.

For example, a 1029th data transmission time slice (Data Transmission TimeSlice_1029) may be associated with the FBSCA procedure. At this point, a TRN-T that is included in the 1029th data transmission time slice (Data Transmission TimeSlice_1029) has a length of approximately 1 us.

Furthermore, a 1031st data transmission time slice (Data Transmission TimeSlice_1031) may be associated with the NSCS procedure for a MIMO phase. At this point, a TRN-T that is included in the 1031st data transmission time slice (Data Transmission TimeSlice_1031) has a length of approximately 1 us.

When the 1031st data transmission time slice (Data Transmission TimeSlice_1031) is passed, a new sector combination may be determined based on information that is obtained through a previous data transmission time slice that is associated with the NSCS procedure.

A time period required for performing the operation shown in FIG. 24 are 50 times longer than the time period (approximately 12 ms) that is required for performing the existing MIMO beamforming. However, since the operation shown in FIG. 24 is associated with the data transmission operation, the operation shown in FIG. 24 may support real-time operation.

Figure 25:
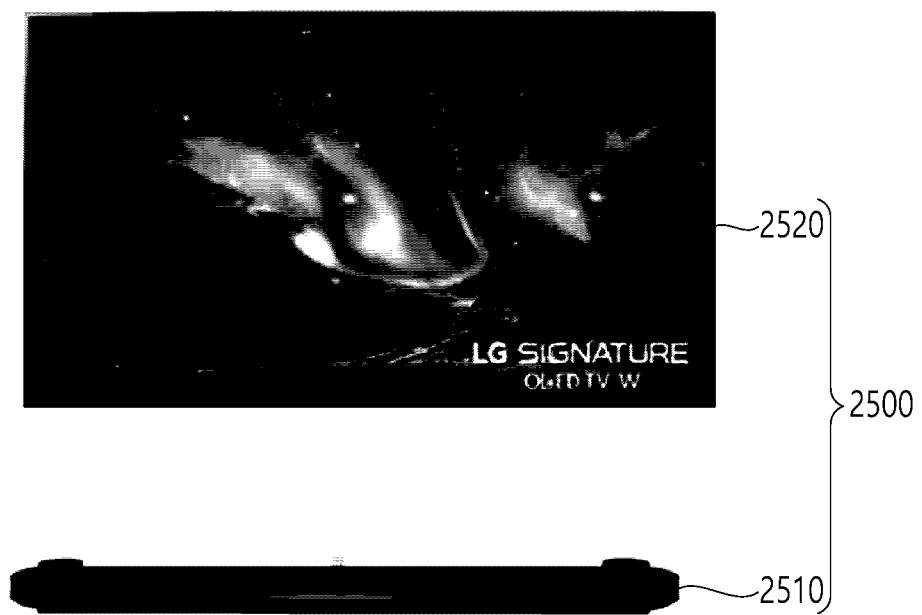
FIG. 25 shows an exemplary application of a wireless AV system applying a method for maintaining beamforming according to the present embodiment.

FIG. 25 shows an exemplary application of a wireless AV system applying a method for maintaining beamforming according to the present embodiment.

A wireless AV system (2500) to which the present embodiment is applied may be a display device system, such as OLED TV. The wireless AV system (2500) may include a first electronic device (2510) and a second electronic device (2520), which corresponds to a TV panel.

FIG. 26 is a block diagram showing an exemplary application of a wireless system for maintaining beamforming in a wireless AV system according to the present embodiment.

Referring to FIG. 26, a wireless AV system (1000) may include a main body device (1100) and a panel device (1200).

The main body device (1100) may include a broadcast receiver (1110), an external device interface unit (1115), a storage unit (1120), a main body controller (1130), and a wireless communication unit (1140).

The broadcast receiver (1110) may include a tuner (1111), a demodulator (1112), and a network interface unit (1113).

The tuner (1111) may select a specific broadcast channel in accordance with a channel selection command. The tuner (1111) may receive a broadcast signal corresponding to the selected specific broadcast channel.

The demodulator (1112) may separate the received broadcast signal to a video signal, an audio signal, and a data signal related to a broadcast program. And, then, the demodulator (1112) may restore (or recover) the separated video signal, audio signal, and data signal to a format that can be outputted.

The network interface unit (1113) may provide an interface for connecting the wireless AV system (1000) to a wired/wireless network including an internet network. The network interface unit (1113) may transmit or receive data to or from another user or another electronic device through an accessed network or another network linked to the accessed network.

The network interface unit (1113) may access a predetermined webpage through an accessed network or another network linked to the accessed network. That is, the network interface unit (1113) may transmit or receive data to or from a corresponding server by accessing a predetermined webpage through the network.

Also, the network interface unit (1113) may receive contents or data provided from a content provider or a network operator. That is, the network interface unit (1113) may receive contents such as movies, advertisements, games, VODs, and broadcast signals, which are provided from a content provider or a network provider, and related information through network.

Additionally, the network interface unit (1113) may receive firmware update information and update files provided from a network operator and may transmit data to an internet or content provider or a network operator.

The network interface unit (1113) may select and receive a wanted application among applications that are open to public, through the network.

The external device interface unit (1115) may receive an application or an application list of a nearby (or neighboring) external device and may communicate (or deliver) the application or application list to the storage unit (1120) or main body controller (1130).

The external device interface unit (1115) may provide a connection path between the wireless AV system (1000) and an external device. The external device interface unit (1115) may receive at least one of image (or video) and audio outputted from an external device (not shown), which is connected to the wireless AV system (1000) via wired or wireless connection, and may then deliver the received image and/or audio to the main body controller (1130). The external device interface unit (1115) may include multiple external input terminals. The multiple external input terminals may include RGB terminals, one or more High Definition Multimedia Interface (HDMI) terminals, component terminals.

A video signal of an external device that is inputted through the external device interface unit (1115) may be outputted through a display unit (1240) after passing through a wireless communication unit. An audio signal of an external device that is inputted through the external device interface unit (1115) may be outputted through an audio output unit (1250).

An external device that is connectable to the external device interface unit (1115) may be any one of a set-top box, a Bluray player, a DVD player, a gaming system, a sound bar, a smart phone, a PC, a USB memory, a home theater system. However, this is merely exemplary.

Additionally, some content data stored in the wireless AV system (1000) may be transmitted to a user or an electronic device, which is selected from other users or other electronic devices that are pre-registered in the wireless AV system (1000).

The storage unit (1120) may store programs for performing each signal processing and control within the main body controller (1130), and then the storage unit (1120) may store signal-processed image, voice, or data signals.

Additionally, the storage unit (1120) may perform a function for temporarily storing image, voice, or data signals that are inputted from the external device interface unit (1115) or network interface unit (1113), and the storage unit (1120) may also store information related to a predetermined image through a channel memory function.

The storage unit (1120) may store an application or an application list that is inputted from the external device interface unit (1115) or network interface unit (1113).

The wireless AV system (1000) may play (or reproduce) content files (video files (or moving picture image files), still image files, music files, document files, application files, and so on) that are stored in the storage unit (1120) and may provide the content files to a user.

The main body controller (1130) may control the overall operations of the wireless AV system (1000).

In order to display an image on a display unit (1240), the main body controller (1130) may operate a panel controller (1230) through a control signal. For example, the main body controller (1130) may perform control operations so that a broadcast image being inputted through the tuner (1111), or an external input image being inputted through the external device interface unit (1115), or an image being inputted through the network interface unit (1113), or an image being stored in the storage unit (1120) can be displayed on the display unit (1240). In this case, the image being displayed on the display unit (1240) may be a still image or a video (i.e., moving picture image), and the image may also be a 2D image or 3D image.

A video-processed video signal that is processed by the main body controller (1130) may be inputted to the display unit (1240), after passing through a wireless communication unit (1140, 1210), and may then be displayed as an image corresponding to the video-processed video signal. Additionally, the video-processed video signal that is processed by the main body controller (1130) may be inputted to an external output device through the external device interface unit (1115).

An audio-processed video signal that is processed by the main body controller (1130) may be audio-outputted through an audio output unit (1250), after passing through the wireless communication unit (1140, 1210). Additionally, the audio-processed video signal that is processed by the main body controller (1130) may be inputted to an external output device through the external device interface unit (1115).

The wireless communication unit (1140) may be wirelessly connected to the wireless communication unit (1210), which is included in the panel device (1200), according to a specific communication protocol. The wireless communication unit (1140) may transmit information that is received from the main body controller (1130) to the panel device (1200) or may receive information from the panel device (1200).

The panel device (1120) may include a wireless communication unit (1210), a user input interface unit (1220), a panel controller (1230), a display unit (1240), an audio output unit (1250), and a power supply unit (1260).

The wireless communication unit (1210) may be wirelessly connected to the wireless communication unit (1140), which is included in the main body device (1100), according to a specific communication protocol. The wireless communication unit (1210) may transmit information that is received from the panel controller (1230) to the main body device (1100) or may receive information from the main body device (1100).

The user input interface unit (1220) may communicate (or deliver) signals that are inputted by the user to the panel controller (1230) or communicate (or deliver) signals from the panel controller (1230) to the user.

For example, the user input interface unit (1220) may receive or process control signals, such as power on/off, channel selection, and screen settings from a remote control device (1300) or may transmit control signals from the panel controller (1230) to the remote control device (1300) according to various communication methods, such as Bluetooth, Ultra Wideband (UWB), ZigBee, Radio Frequency (RF), or Infrared (IR) communication, and so on.

Additionally, the user input interface unit (1220) may communicate (or deliver), to the panel controller (1230), control signals that are inputted from a local key (not shown), such as a power key, a channel key, a volume key, a setup key, and so on.

Meanwhile, the panel controller (1230) may control the panel device (1200) based on a user command that is inputted through the user input interface unit (1220), or based on a control signal or internal program that is inputted through the main body controller (1130).

The panel controller (1230) may allow information on a channel that is selected by the user, and so on, to be outputted together with the processed video or audio signal through the display unit (1240) or audio output unit (1250).

Additionally, according to an external device image playback command that is received through the user input interface unit (1220), the panel controller (1230) may output image signals (or video signals) or voice signals (audio signals) of an external device, such as a camera or a camcorder, which are inputted through the external device interface unit (1115), to the display unit (1240) or the audio output unit (1250).

The display unit (1240) may convert image signals, data signals, or OSD signals, which are processed in the main body controller (1130), or images signals or data signals, which are received in the external device interface unit (1115), into R, G, and B signals so as to generate driving signals.

Meanwhile, the wireless AV system (1000) shown in FIG. 26 is merely an exemplary application of the present specification. And, therefore, among the components shown in FIG. 26, some of the components may be integrated, added, or omitted according to the specification of the wireless AV system (1000) that is actually implemented.

According to another embodiment of the present specification, unlike the example shown in FIG. 26, the wireless AV system (1000) may receive an image through a network interface unit (1113) or external device interface unit (1115), without being equipped with a tuner (1111) and a demodulator (1112), and may then play (or reproduce) the received image.

For example, the wireless AV system (1000) may be separately implemented to include an image processing device, such as a set-top box for receiving broadcast signals or contents according to various network services, and a content playing device, which plays (or reproduces) contents that are inputted from the image processing device.

Although a detailed embodiment is described in the detailed description of the present specification, it will be apparent that various modifications can be made without departing from the scope of the present specification. And, therefore, the scope of the present specification shall not be limited only to the above-described embodiment and shall rather be determined based on the scope of the claims that will hereinafter be described as well as the equivalents of the scope of the claims of the present disclosure.

What is claimed is:

1. A method for maintaining beamforming in a wireless audio-video (AV) system, the method comprising:
transmitting, by a first wireless device, a packet including a non-training field and multiple training fields to a second wireless device,
wherein the non-training field is transmitted based on a best sector combination among predetermined multiple candidate sector combinations between the first wireless device and the second wireless device, and
wherein the multiple training fields are transmitted based on the multiple candidate sector combinations;
receiving, by the first wireless device, candidate beam feedback information as a response to the multiple training fields;
determining, by the first wireless device, whether or not a channel change that is caused by blockage occurs based on the candidate beam feedback information; and
based on a determined result that the channel change occurs, updating, by the first wireless device, the best sector combination based on the candidate feedback information.

2. The method of claim 1, wherein the candidate beam feedback information includes information related to a channel status for each of the multiple candidate sector combinations.

3. The method of claim 1, wherein the information related to the multiple sector combinations is determined through multi input multi output (MIMO) beamforming procedure.

4. The method of claim 1, further comprising:
determining, by the first wireless device, whether or not a trigger condition for initiating a Nearby Best Sector Combination Tracking procedure is satisfied; and
when it is determined that the trigger condition is satisfied, performing, by the first wireless device, the Nearby Best Sector Combination Tracking procedure.

5. The method of claim 4, wherein the step of performing the Nearby Best Sector Combination Tracking procedure comprises:
transmitting multiple training fields for multiple nearby beam combinations being associated with the multiple candidate sector combinations to the second wireless device; and
receiving nearby beam feedback information as a response to the multiple training fields for the multiple nearby beam combinations.

6. The method of claim 4, wherein the trigger condition is associated with whether or not a predetermined tracking timer is expired or whether or not a best sector quality is degraded to a threshold value or less.

7. The method of claim 1, further comprising:
determining, by the first wireless device, whether or not a sector combination search opportunity is obtained; and
when it is determined that the sector combination search opportunity is obtained, performing, by the first wireless device, a New Sector Combination Search procedure,
wherein the multiple candidate sector combinations are updated through the New Sector Combination Search procedure.

8. A first wireless device performing a method for maintaining beamforming in a wireless audio-video (AV) system, the first wireless device comprising:
- a transceiver transmitting or receiving a wireless signal; and
- a processor controlling the transceiver,
- wherein the processor is configured to:
  - transmit a packet including a non-training field and multiple training fields to a second wireless device, wherein the non-training field is transmitted based on a best sector combination among predetermined multiple candidate sector combinations between the first wireless device and the second wireless device, and wherein the multiple training fields are transmitted based on the multiple candidate sector combinations,
  - receive candidate beam feedback information as a response to the multiple training fields,
  - determine whether or not a channel change that is caused by blockage occurs based on the candidate beam feedback information, and
  - based on a determined result that the channel change occurs, update the best sector combination based on the candidate feedback information.

9. The first wireless device of claim 8, wherein the candidate beam feedback information includes information related to a channel status for each of the multiple candidate sector combinations.

10. The first wireless device of claim 8, wherein the information related to the multiple sector combinations is determined through a multi input multi output (MIMO) beamforming procedure.

11. The first wireless device of claim 8, wherein the processor is further configured to:
- determine whether or not a trigger condition for initiating a Nearby Best Sector Combination Tracking procedure is satisfied, and
- when it is determined that the trigger condition is satisfied, perform the Nearby Best Sector Combination Tracking procedure.

12. The first wireless device of claim 11, wherein the processor is further configured to:
- transmit multiple training fields for multiple nearby beam combinations being associated with the multiple candidate sector combinations to the second wireless device, and
- receive nearby beam feedback information as a response to the multiple training fields for the multiple nearby beam combinations.

13. The first wireless device of claim 11, wherein the trigger condition is associated with whether or not a predetermined tracking timer is expired or whether or not a best sector quality is degraded to a threshold value or less.

14. The first wireless device of claim 8, wherein the processor is further configured to:
- determine whether or not a sector combination search opportunity is obtained, and
- when it is determined that the sector combination search opportunity is obtained, perform a New Sector Combination Search procedure,
- wherein the multiple candidate sector combinations are updated through the New Sector Combination Search procedure.

* * * * *